US010021287B2

United States Patent
Irie et al.

(10) Patent No.: US 10,021,287 B2
(45) Date of Patent: Jul. 10, 2018

(54) IMAGING CONTROL DEVICE, IMAGING DEVICE, IMAGING CONTROL METHOD, AND PROGRAM FOR TRANSMITTING AN IMAGING PREPARATION COMMAND, RECEIVING A PREPARATION COMPLETION COMMAND, AND TRANSMITTING A CAPTURED IMAGE ACQUISITION COMMAND

(71) Applicant: FUJIFILM Corporation, Tokyo (JP)

(72) Inventors: Fuminori Irie, Saitama (JP); Mikio Watanabe, Saitama (JP); Takeshi Misawa, Saitama (JP); Masaya Tamaru, Saitama (JP); Daisuke Hayashi, Saitama (JP); Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/433,594

(22) Filed: Feb. 15, 2017

(65) Prior Publication Data
US 2017/0163871 A1 Jun. 8, 2017

Related U.S. Application Data

(63) Continuation of application No. PCT/JP2015/068043, filed on Jun. 23, 2015.

(30) Foreign Application Priority Data

Sep. 10, 2014 (JP) ................................. 2014-184167

(51) Int. Cl.
*H04N 5/232* (2006.01)
*H04N 5/247* (2006.01)

(52) U.S. Cl.
CPC ..... *H04N 5/23206* (2013.01); *H04N 5/23212* (2013.01); *H04N 5/23216* (2013.01); *H04N 5/23293* (2013.01); *H04N 5/247* (2013.01)

(58) Field of Classification Search
CPC ........... H04N 5/23206; H04N 5/23212; H04N 5/23216; H04N 5/23293; H04N 5/247
See application file for complete search history.

(56) References Cited

U.S. PATENT DOCUMENTS 9,842,418 B1 * 12/2017 Crosby .................. G06T 11/60
2006/0165405 A1 * 7/2006 Kanai ................ H04N 5/23203
396/334

(Continued)

FOREIGN PATENT DOCUMENTS

JP     2001-111866 A     4/2001
JP     2003-60953 A      2/2003

(Continued)

OTHER PUBLICATIONS

International Preliminary Report on Patentability issued in PCT/JP2015/068043 (PCT/IPEA/409), dated Feb. 5, 2016.

(Continued)

*Primary Examiner* — Nicholas G Giles
(74) *Attorney, Agent, or Firm* — Birch, Stewart, Kolasch & Birch, LLP

(57) ABSTRACT

An imaging control device 100 includes a control communication unit 110 that communicates with a plurality of imaging devices and an overall control unit 101. The overall control unit 101 transmits an imaging preparation command to prepare imaging to each of the plurality of imaging devices 10 through the control communication unit 110 in response to an instruction received through an instruction receiving unit, receives preparation completion information indicating the completion of preparation for imaging from each of the plurality of imaging devices 10 through the (Continued)

control communication unit 110, and transmits a captured image acquisition command to acquire a captured image to each of the plurality of imaging devices 10 through the control communication unit 110 after receiving the preparation completion information from the plurality of imaging devices 10.

20 Claims, 16 Drawing Sheets

(56) References Cited

U.S. PATENT DOCUMENTS

| | | | |
|---|---|---|---|
| 2011/0205380 A1* | 8/2011 | Shirakawa | H04N 5/232 348/211.9 |
| 2016/0241794 A1* | 8/2016 | Lee | H04N 1/00204 |

FOREIGN PATENT DOCUMENTS

| | | |
|---|---|---|
| JP | 2006-246355 A | 9/2006 |
| JP | 2009-273033 A | 11/2009 |
| JP | 2009-296323 A | 12/2009 |
| JP | 2011-172123 A | 9/2011 |
| JP | 2012-70336 A | 4/2012 |

OTHER PUBLICATIONS

International Search Report issued in PCT/JP2015/068043 (PCT/ISA/210), dated Sep. 29, 2015.
Written Opinion of the International Search Authority issued in PCT/JP2015/068043 (PCT/ISA/237), dated Sep. 29, 2015.

\* cited by examiner

FIG. 8
<POSITION OF IMAGES>
(1)
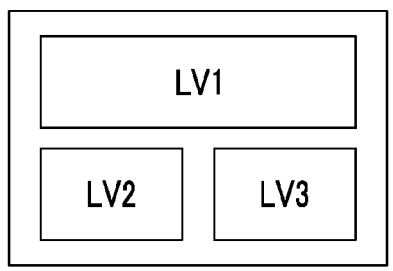
(2)
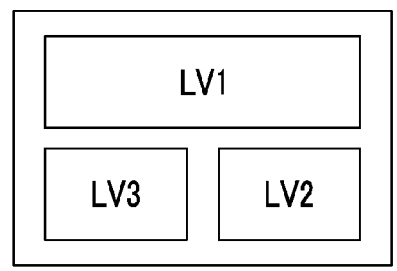
(3)
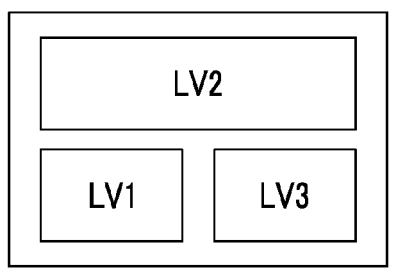
(4)
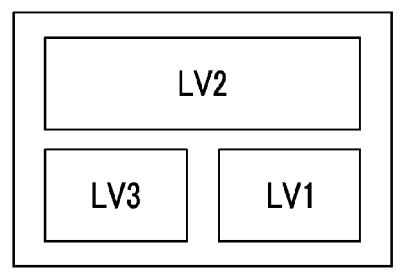
(5)
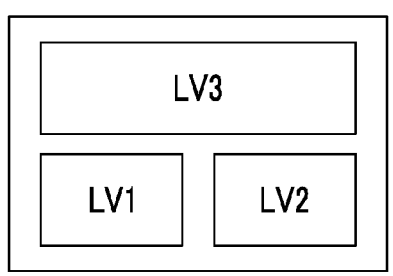
(6)
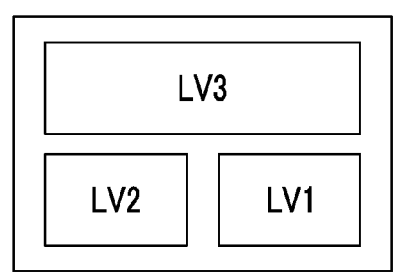

FIG. 9
(a)
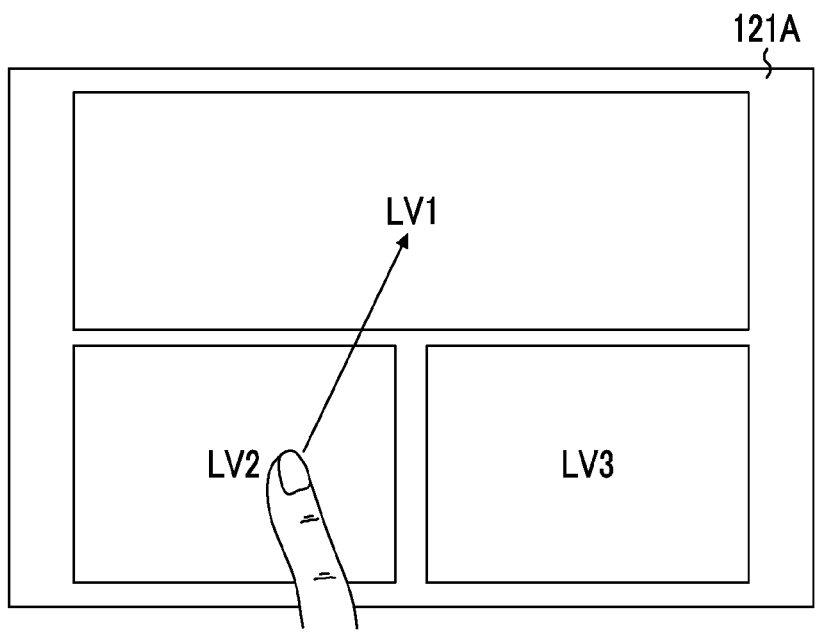
(b)
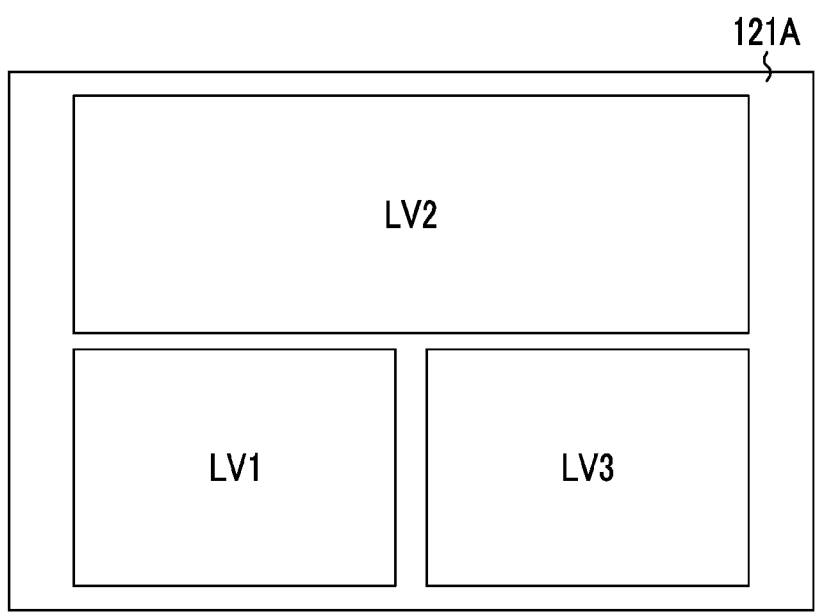

FIG. 10
(a)
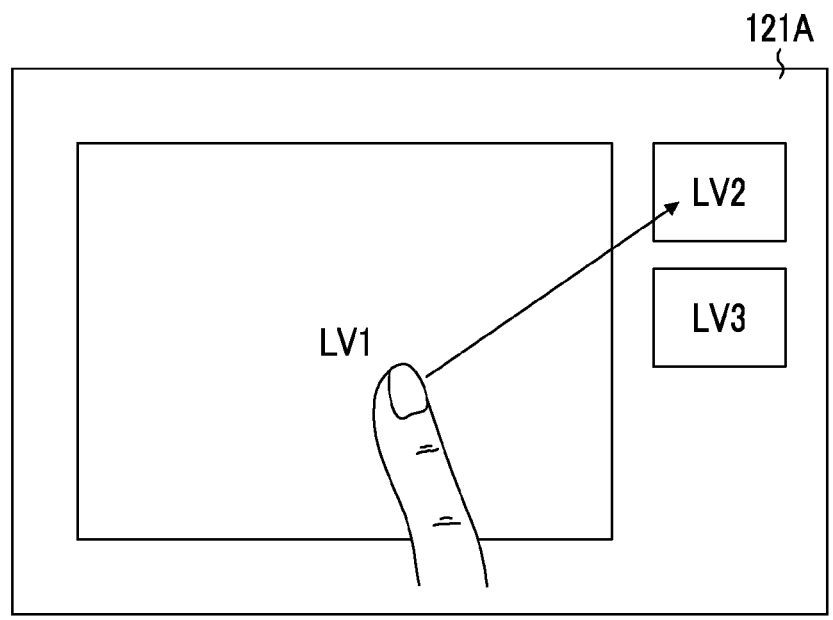
(b)
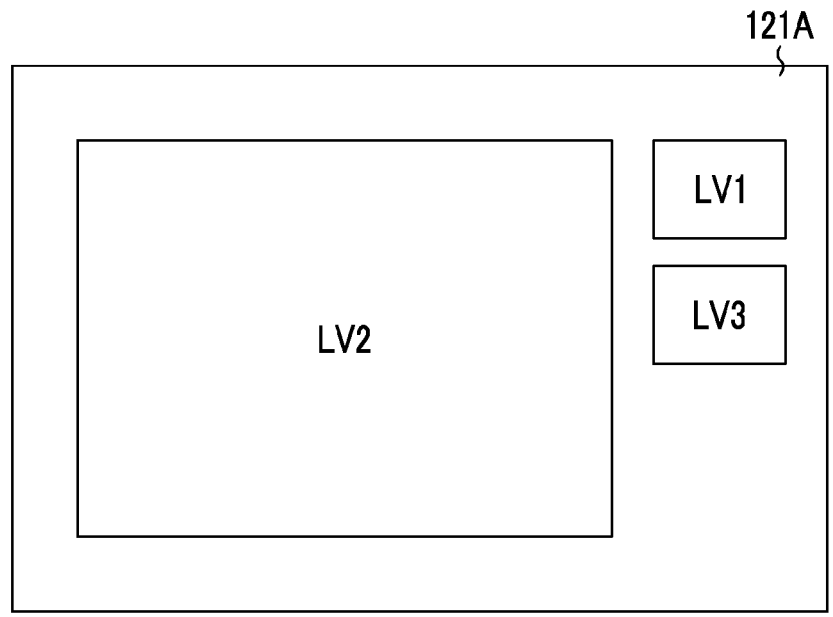

IMAGING CONTROL DEVICE, IMAGING DEVICE, IMAGING CONTROL METHOD, AND PROGRAM FOR TRANSMITTING AN IMAGING PREPARATION COMMAND, RECEIVING A PREPARATION COMPLETION COMMAND, AND TRANSMITTING A CAPTURED IMAGE ACQUISITION COMMAND

CROSS-REFERENCE TO RELATED APPLICATIONS

This application is a Continuation of PCT International Application No. PCT/JP2015/068043 filed on Jun. 23, 2015, which claims priority under 35 U.S.C. § 119(a) to Japanese Patent Application No. 2014-184167 filed on Sep. 10, 2014. Each of the above applications is hereby expressly incorporated by reference, in their entirety, into the present application.

BACKGROUND OF THE INVENTION

1. Field of the Invention

The present invention relates to an imaging control device, an imaging device, an imaging control method, and a program, and more particularly, to an imaging control device, an imaging device, an imaging control method, and a program that enable a plurality of imaging devices to synchronously capture images.

2. Description of the Related Art

In the recent years, a technique has been considered in which the overall operation of a plurality of imaging devices is controlled through wired or wireless communication and an imaging operation of each imaging device is controlled.

For example, JP2011-172123A discloses a technique in which a master camera transmits an exposure start instruction signal to a slave camera, considering a delay time from the reception of the exposure start instruction signal from the master camera by the slave camera to the start of exposure, in order to control the exposure start time of the master camera and the slave camera.

For example, JP2009-296323A discloses a technique which corrects a signal delay time due to wiring for each slave camera which is connected to a master camera by a signal path among a plurality of cameras and performs synchronous imaging.

SUMMARY OF THE INVENTION

However, in a case in which an imaging device captures an image of an object, the imaging device needs to be focused o the object. In a case in which the imaging device is automatically focused on the object (auto focus), the imaging devices may have different auto focus times. Therefore, in some cases, when the imaging times of a plurality of imaging devices are forcibly synchronized without considering different auto focus times of the imaging devices, defocused images are acquired. In contrast, in some cases, when each imaging device captures an image after auto focus is completed, a plurality of imaging devices capture images at different times.

JP2011-172123A and JP2009-296323A do not disclose the case in which the imaging devices have different auto focus times.

The invention has been made in view of the above-mentioned problems and an object of the invention is to provide an imaging control device, an imaging device, an imaging control method, and a program that can synchronize the imaging times of a plurality of imaging devices and enable an imaging device which has completed preparation for imaging to acquire an appropriate image.

According to an aspect of the invention, there is provided an imaging control device comprising: an instruction receiving unit that receives an instruction from a user; a control communication unit that communicates with a plurality of imaging devices; and an overall control unit that is connected to the instruction receiving unit and the control communication unit. The overall control unit transmits an imaging preparation command to prepare imaging to each of the plurality of imaging devices through the control communication unit in response to the instruction received through the instruction receiving unit. The overall control unit receives preparation completion information indicating the completion of the preparation for imaging from each of the plurality of imaging devices through the control communication unit. After receiving the preparation completion information from the plurality of imaging devices, the overall control unit transmits a captured image acquisition command to acquire a captured image to each of the plurality of imaging devices through the control communication unit.

According to this aspect, the imaging control device transmits the imaging preparation command to each of the plurality of imaging devices. The imaging control device receives the preparation completion information from each of the plurality of imaging devices. The imaging control device transmits the captured image acquisition command to each of the plurality of imaging devices. Therefore, according to this aspect, the plurality of imaging devices can synchronously acquire the captured images and it is possible to control the imaging device that has completed preparation for image such that the imaging device acquires an appropriate image.

Preferably, the preparation for imaging includes at least focus adjustment and focus lock.

According to this aspect, an image is acquired by the imaging device that has completed at least focus adjustment and focus lock. Therefore, it is possible to acquire the images that are synchronously captured and are in focus.

Preferably, in a case in which the instruction receiving unit receives the instruction, the overall control unit transmits the captured image acquisition command to each of the plurality of imaging devices through the control communication unit.

According to this aspect, in a case in which the instruction receiving unit receives the instruction, the captured image acquisition command is transmitted. Therefore, it is possible to transmit the transmission time of the captured image acquisition command.

Preferably, the instruction receiving unit includes an imaging preparation instruction unit and an image acquisition instruction unit. Preferably, the overall control unit transmits the imaging preparation command to each of the plurality of imaging devices through the control communication unit in a case in which the imaging preparation instruction unit receives the instruction. Preferably, the overall control unit transmits the captured image acquisition command to each of the plurality of imaging devices through the control communication unit in a case in which the image acquisition instruction unit receives the instruction.

According to this aspect, in a case in which the imaging preparation instruction unit receives the instruction, the imaging preparation command is transmitted. In a case in which the image acquisition instruction unit receives the instruction, the captured image acquisition command is transmitted. Therefore, the transmission of the imaging preparation command and the transmission of the captured image acquisition command can be instructed by different instruction units. As a result, the user can appropriately use the imaging preparation instruction unit and the image acquisition instruction unit to transmit the imaging preparation command and the captured image acquisition command to the plurality of imaging devices, without confusing the imaging preparation command and the captured image acquisition command.

Preferably, in a case in which the image acquisition instruction unit receives the instruction before the preparation completion information is received, the overall control unit transmits the captured image acquisition command to each of the plurality of imaging devices through the control communication unit after the preparation completion information is received from the plurality of imaging devices.

According to this aspect, in a case in which the image acquisition instruction unit receives the instruction before the preparation completion information is received, the captured image acquisition command is transmitted immediately after the preparation completion information is received from the plurality of imaging devices. Therefore, an image acquisition instruction may not be issued after the preparation completion information is received and an image is acquired immediately after preparation for imaging is completed.

Preferably, the instruction receiving unit has a touch panel including a display unit and a position input unit and at least one of the imaging preparation instruction unit or the image acquisition instruction unit is formed by the touch panel.

According to this aspect, at least one of the imaging preparation instruction unit or the image acquisition instruction unit is formed by the touch panel. Therefore, the user can simply operate the imaging control device, using the touch panel.

Preferably, the overall control unit displays a first command image indicating the imaging preparation instruction unit and a second command image indicating the image acquisition instruction unit on the display unit. Preferably, in a case in which a position corresponding to the first command image in the position input unit is touched, the overall control unit transmits the imaging preparation command to each of the plurality of imaging devices through the control communication unit. Preferably, in a case in which a position corresponding to the second command image in the position input unit is touched, the overall control unit transmits the captured image acquisition command to each of the plurality of imaging devices through the control communication unit.

According to this aspect, the overall control unit displays the first command image and the second command image on the display unit, transmits the imaging preparation command in response to the touch of the first command image, and transmits the captured image acquisition command in response to the touch of the second command image. Therefore, the user can appropriately touch the position corresponding to the first command image and the position corresponding to the second command image in the position input unit to reliably transmit the imaging preparation command and the captured image acquisition command to the plurality of imaging devices, without confusing the imaging preparation command and the captured image acquisition command.

Preferably, the overall control unit displays the first command image and the second command image on the display unit at the same time.

according to this aspect, since the first command image and the second command image are displayed at the same time, it is possible to effectively prevent the imaging preparation command and the captured image acquisition command from being erroneously transmitted.

Preferably, the overall control unit displays the first command image on the display unit before transmitting the imaging preparation command to each of the plurality of imaging devices and displays the second command image on the display unit after transmitting the imaging preparation command to each of the plurality of imaging devices.

According to this aspect, since the second command image is displayed after the first command image is displayed, it is possible to effectively prevent the imaging preparation command and the captured image acquisition command from being erroneously transmitted.

Preferably, the instruction receiving unit includes hardware keys and at least one of the imaging preparation instruction unit or the image acquisition instruction unit is the hardware key.

according to this aspect, since at least one of the imaging preparation instruction unit or the image acquisition instruction unit is the hardware key, the user can simply operate the imaging control device, using the hardware key.

Preferably, the hardware keys include a first command key and a second command key. Preferably, in a case in which the first command key receives the instruction, the overall control unit transmits the imaging preparation command to each of the plurality of imaging devices through the control communication unit. Preferably, in a case in which the second command key receives the instruction, the overall control unit transmits the captured image acquisition command to each of the plurality of imaging devices through the control communication unit.

According to this aspect, since the first command key and the second command key are provided as the hardware keys, the user can simply operate the imaging control device, using the hardware keys.

Preferably, in a case in which the second command key receives the instruction before the imaging preparation command is transmitted to each of the plurality of imaging devices, the overall control unit transmits the imaging preparation command to each of the plurality of imaging devices through the control communication unit before transmitting the captured image acquisition command and transmits the captured image acquisition command to each of the plurality of imaging devices through the control communication unit after the preparation completion information is received from the plurality of imaging devices.

According to this aspect, in a case in which the second command key receives the instruction before the imaging preparation command is transmitted to each of the plurality of imaging devices, the captured image acquisition command is transmitted immediately after the preparation completion information is received. Therefore, after the preparation completion information is received, the second command key may not receive the instruction and an image is acquired immediately after preparation for imaging is completed.

Preferably, the hardware keys include a third command key. Preferably, in a case in which the third command key receives the instruction before the imaging preparation command is transmitted to each of the plurality of imaging devices, the overall control unit transmits the imaging preparation command to each of the plurality of imaging devices through the control communication unit. Preferably, in a case in which the third command key receives the instruction after the imaging preparation command is transmitted to each of the plurality of imaging devices, the overall control unit transmits the captured image acquisition command to each of the plurality of imaging devices through the control communication unit.

Preferably, the imaging control device further comprises a display unit that is connected to the overall control unit.

Preferably, the imaging control device further comprises a position input unit that is provided in the display unit. Preferably, the display unit and the position input unit form a touch panel.

According to this aspect, since the imaging control device comprises the touch panel formed by the display unit and the position input unit, the user can touch the touch panel to operate the imaging control device.

Preferably, the overall control unit displays a third command image indicating an instruction to perform the preparation for imaging again on the display unit after the preparation completion information is received. Preferably, in a case in which a position corresponding to the third command image in the position input unit is touched, the overall control unit transmits a re-preparation command to perform the preparation for imaging again to each of the plurality of imaging devices through the control communication unit.

According to this aspect, when the position corresponding to the third command image is touched, the preparation for imaging is performed again. Therefore, it is possible to capture images after preparation for imaging is appropriately performed.

Preferably, the overall control unit displays the third command images related to each of the plurality of imaging devices on the display unit. Preferably, in a case in which a position corresponding to the third command image in the position input unit is touched, the overall control unit transmits the re-preparation command only to an imaging device associated with the third command image corresponding to the touched position among the plurality of imaging devices through the control communication unit.

According to this aspect, when the position corresponding to the third command image is touched, the imaging preparation operation of the imaging device associated with the third command image is performed again. It is possible to perform the imaging preparation operation of a desired imaging device, if necessary. It is possible to capture images after preparation for imaging is appropriately performed.

Preferably, the overall control unit receives live view image data from at least one of the plurality of imaging devices through the control communication unit and displays a live view image created from the live view image data on the display unit. Preferably, the third command image is the live view image.

According to this aspect, since the third command image is the live view image, the user can intuitively perform a command transmission operation while checking the live view image.

Preferably, the overall control unit transmits a burst capture command to perform a burst capture to each of the plurality of imaging devices through the control communication unit after the preparation for imaging is completed. Preferably, the captured image acquisition command includes imaging time information indicating the imaging time of a captured image which is used as a synchronous image among the captured images acquired by the burst capture operation of each of the plurality of imaging devices.

According to this aspect, when preparation for imaging is completed, each of the plurality of imaging devices starts the burst capture and the overall control unit can acquire the synchronous images of the plurality of imaging devices on the basis of the imaging time information. Therefore, according to this aspect, it is possible to acquire the images which are captured substantially at the same time, effectively using a burst capture function of each of the plurality of imaging devices.

Preferably, the overall control unit receives error notification information indicating an error from each of the plurality of imaging devices through the control communication unit. Preferably, in a case in which the error notification information is received, the overall control unit notifies the user of the error.

According to this aspect, since the overall control unit notifies the user of errors that occur in each of the plurality of imaging devices, the user can certainly know errors in the imaging devices.

Preferably, the error is an error in the preparation for imaging in each of the plurality of imaging devices.

According to this aspect, since the error in preparation for imaging is notified, the user can certainly know the error in preparation for imaging.

Preferably, the imaging control device further comprises a display unit that is connected to the overall control unit. Preferably, the overall control unit receives live view image data from each of the plurality of imaging devices through the control communication unit, displays a live view image created from the live view image data on the display unit, and displays an error image indicating the error on the display unit so as to be superimposed on the live view image captured by an imaging device in which the error has occurred among the plurality of imaging devices.

According to this aspect, since the error is displayed so as to be superimposed on the live view image captured by the imaging device, the user can intuitively recognize the error or the imaging device in which the error has occurred.

Preferably, the overall control unit does not transmit the captured image acquisition command to the imaging device in which the error has occurred among the plurality of imaging devices.

According to this aspect, since the captured image acquisition command is not transmitted to the imaging device in which an error has occurred, the imaging device in which the error has occurred does not capture an image. Therefore, it is possible to acquire the images captured by the imaging devices in a normal state.

According to another aspect of the invention, there is provided an imaging device that is controlled by the above-mentioned imaging control device. The imaging device comprises an imaging unit, an imaging communication unit that communicates with the control communication unit, and an imaging control unit that is connected to the imaging unit and the imaging communication unit. When the imaging preparation command is received from the imaging control device through the control communication unit and the imaging communication unit, the imaging control unit controls the imaging unit such that the preparation for imaging is performed. When the preparation for imaging is completed, the imaging control unit transmits the preparation completion information to the imaging control device through the imaging communication unit and the control communication unit. When the captured image acquisition command is received from the imaging control device through the control communication unit and the imaging communication unit, the imaging control unit performs a process of acquiring the captured image.

According to still another aspect of the invention, there is provided an imaging control method comprising: an instruction receiving step of receiving an instruction from a user; a step of transmitting an imaging preparation command to prepare imaging to each of a plurality of imaging devices using communication in response to the instruction received in the instruction receiving step; a step of receiving preparation completion information indicating the completion of the preparation for imaging from each of the plurality of imaging devices using communication; and a step of transmitting a captured image acquisition command to acquire a captured image to each of the plurality of imaging devices using communication after the preparation completion information is received from the plurality of imaging devices.

According to yet another aspect of the invention, there is provided a program that causes a computer to perform an imaging control method comprising: an instruction receiving step of receiving an instruction from a user; a step of transmitting an imaging preparation command to prepare imaging to each of a plurality of imaging devices using communication in response to the instruction received in the instruction receiving step; a step of receiving preparation completion information indicating the completion of the preparation for imaging from each of the plurality of imaging devices using communication; and a step of transmitting a captured image acquisition command to acquire a captured image to each of the plurality of imaging devices using communication after the preparation completion information is received from the plurality of imaging devices.

According to the invention, the imaging control device transmits the imaging preparation command to a plurality of imaging devices. The imaging control device receives the preparation completion information from each of the plurality of imaging devices. The imaging control device transmits the captured image acquisition command to each of the plurality of imaging devices. Therefore, it is possible to synchronize the imaging times of the plurality of imaging devices and an appropriate image can be acquired by the imaging device that has completed preparation for imaging.

BRIEF DESCRIPTION OF THE DRAWINGS

FIG. 8 is a diagram illustrating combinations of the positions of images in the layouts.

FIG. 9 is an enlarged view illustrating a case in which three live view images are displayed.

FIG. 10 is a diagram illustrating a case in which one live view image is selected.

DESCRIPTION OF THE PREFERRED EMBODIMENTS

Hereinafter, embodiments of an imaging control device, an imaging device, an imaging control method, and a program according to the invention will be described with reference to the accompanying drawings.

First Embodiment

First, a first embodiment of the invention will be described.

(Imaging Device Control System)

Figure 1:
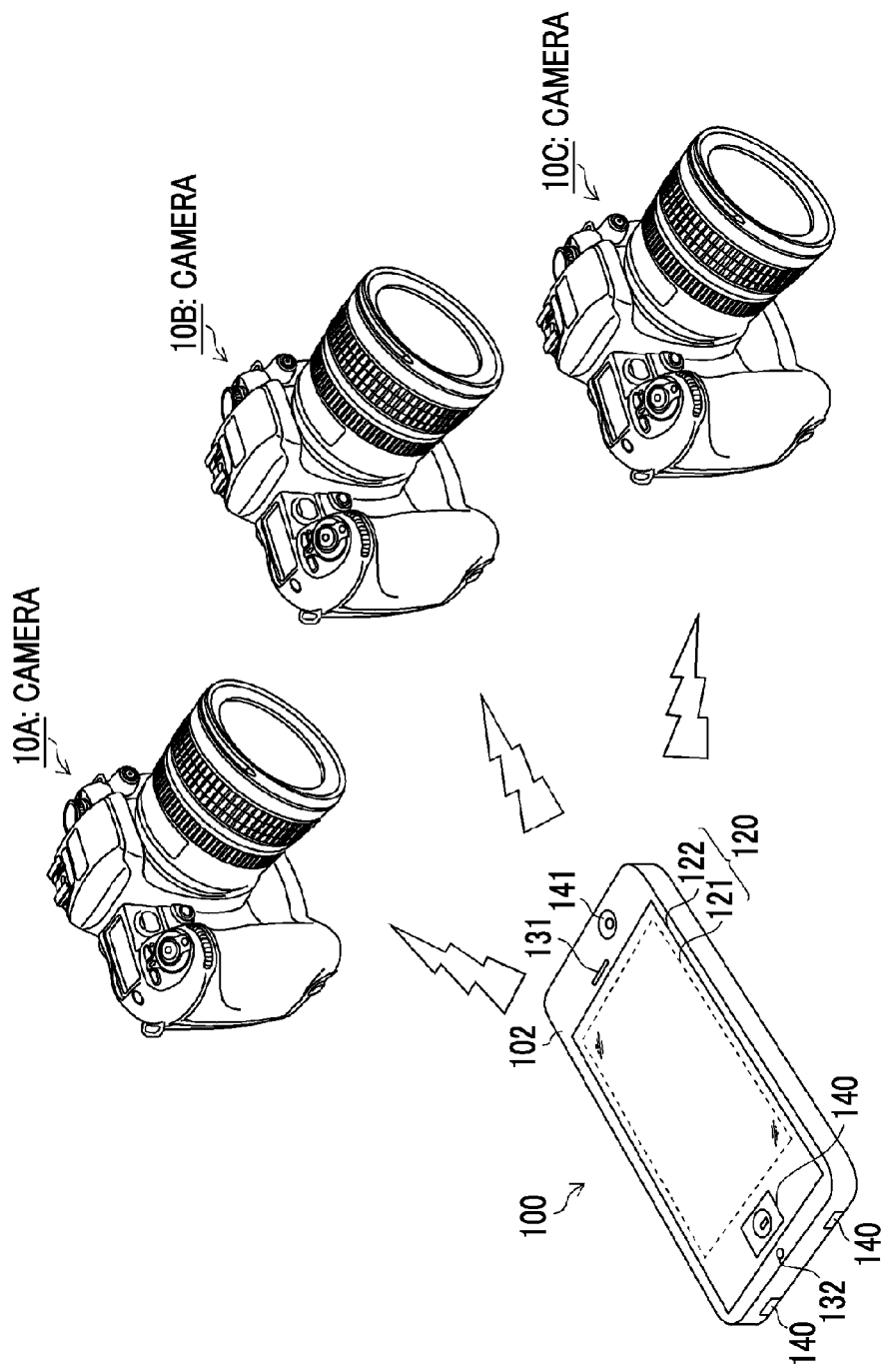
FIG. 1 is a conceptual diagram illustrating a system including an imaging control device and imaging devices.

FIG. 1 is a conceptual diagram illustrating a system including an imaging control device and imaging devices according to the invention.

The system illustrated in FIG. 1 includes a plurality of (three, in this example) imaging devices 10 (cameras 10A, 10B, and 10C) that can capture images and an imaging control device (a smart phone in this example) 100 according to the invention.

The imaging devices 10 (the camera 10A and the cameras 10B and 10C) are general cameras. However, the imaging device 10 is not limited to the above-mentioned type of camera and various types of cameras are used. For example, a digital single-lens reflex camera, a mirrorless digital camera, a compact digital camera, a camera provided in a smart phone, and a pan/tilt camera are used as the imaging device 10.

The imaging control device (hereinafter, also referred to as a smart phone) 100 is wirelessly connected to the imaging devices 10. The smart phone 100 acquires images captured by the imaging devices 10 and transmits instructions to control the imaging devices 10 through wireless communication. In the example illustrated in FIG. 1, the communication between the smart phone 100 and the imaging devices 10 is wireless communication and may be wired communication.

(Internal Structure of Imaging Device)

Next, the internal structure of the imaging device 10 will be described.

Figure 2:
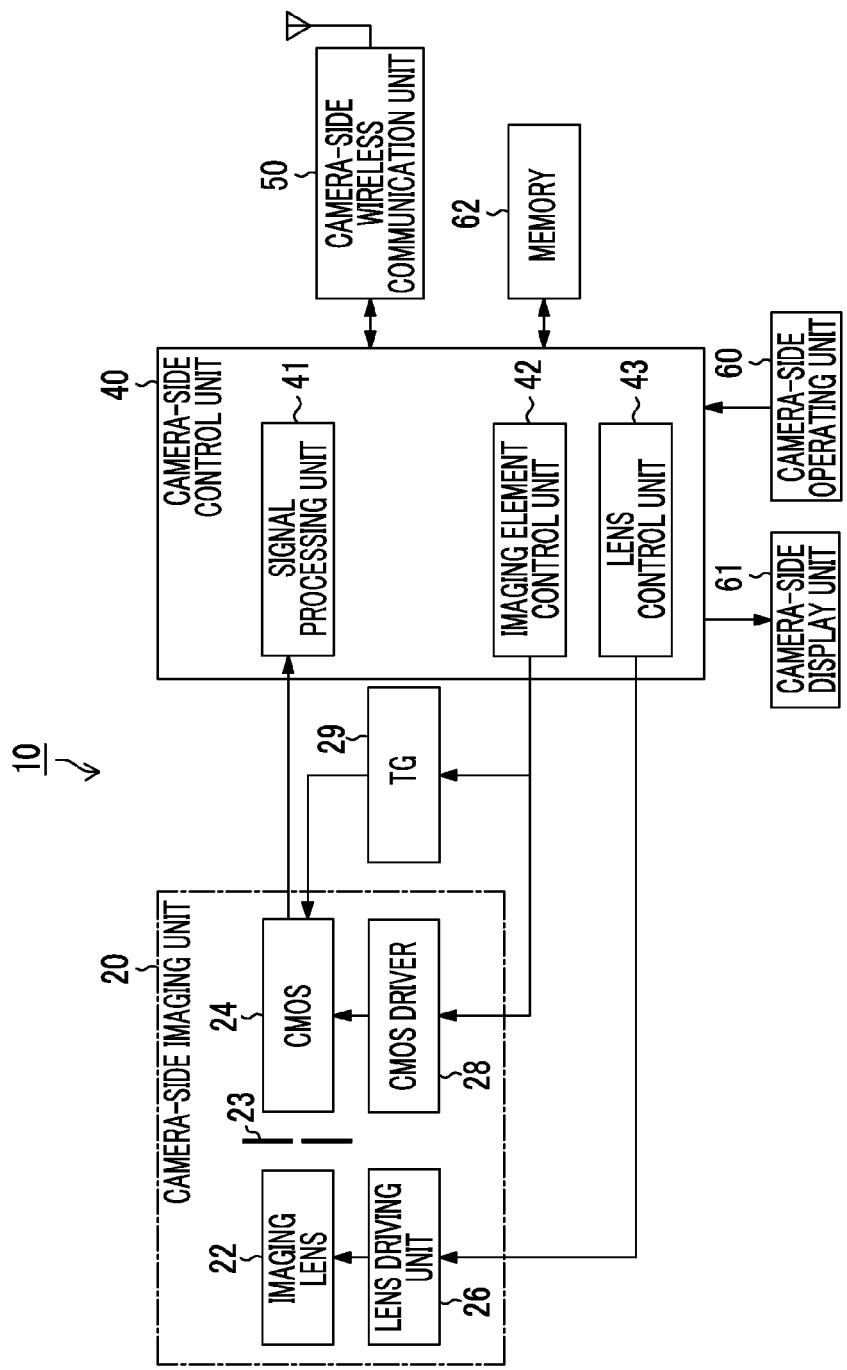
FIG. 2 is a block diagram illustrating an example of the internal structure of the imaging device.

FIG. 2 is a block diagram illustrating an example of the internal structure of the imaging device 10.

The imaging device 10 can capture still images and moving images and comprises a camera-side imaging unit 20, a camera-side control unit (imaging control unit) 40, and a camera-side wireless communication unit (imaging communication unit) 50.

The camera-side imaging unit 20 includes, for example, an imaging lens 22 and an imaging element 24. The imaging lens 22 is a prime lens or a zoom lens and forms an object image on an imaging surface of the imaging element 24. A focus lens, a variable magnification lens (in the case of a zoom lens), and a diaphragm 23 included in the imaging lens 22 are driven by a lens driving unit 26.

In this example, the imaging element 24 is a color imaging element in which color filters of three primary colors, that is, red (R), green (G), and blue (B) are arranged in a predetermined pattern (a Bayer array, a G stripe R/G full-checkered pattern, an X-Trans (registered trademark) array, or a honeycomb array) for each pixel and is a complementary metal oxide semiconductor (CMOS) image sensor. However, the imaging element 24 is not limited to the CMOS image sensor and may be a charge coupled device (CCD) image sensor.

The imaging element 24 is driven by a CMOS driver 28 including, for example, a vertical driver and a horizontal driver and a timing generator (TG) 29. A pixel signal corresponding to the amount of incident object light (a digital signal corresponding to signal charge accumulated in each pixel) is read from the imaging element 24.

A signal processing unit 41 performs signal processing, such as an offset process, a gain control process including white balance correction and sensitivity correction, a gamma correction process, demosaic processing (demosaicing process), and an RGB/YC conversion process, for a digital image signal which is input from the camera-side imaging unit 20. Here, the demosaicing process is a process which calculates all color information of each pixel from a mosaic image corresponding to the color filter array of a single-plate-type color imaging element and is also referred to as a synchronization process. For example, in the case of an imaging element including color filters of three colors, that is, R, G, and B, the demosaicing process calculates the color information of all of R, G, and B of each pixel from an RGB mosaic image. In addition, the RGB/YC conversion process is a process which generates brightness data Y and color difference data items Cb and Cr from the demosaiced RGB image data.

An imaging element control unit 42 issues, for example, an instruction to discharge the charge accumulated in a capacitor of each pixel of the imaging element 24 or an instruction to read a signal corresponding to the charge accumulated in the capacitor through the CMOS driver 28 and the TG 29 and performs imaging control.

A lens control unit 43 controls the focus lens, the variable magnification lens, and the diaphragm 23 included in the imaging lens 22 through the lens driving unit 26 and performs, for example, auto focus (AF) control for moving the focus lens to an in-focus position. The AF control is performed by integrating the absolute values of high-frequency components of a digital signal corresponding to an AF area, detecting an in-focus position where the integrated value (AF evaluation value) is the maximum, and moving the focus lens to the detected in-focus position. For example, the lens control unit 43 performs AF control in response to an imaging preparation command transmitted from the smart phone 100.

The camera-side wireless communication unit 50 performs wireless communication with an external terminal, such as the smart phone 100 illustrated in FIG. 1, and receives various operation instructions input from the smart phone 100 using wireless communication. In addition, the camera-side wireless communication unit 50 transmits, for example, an image to be recorded to the smart phone 100. Furthermore, when the camera-side imaging unit 20 captures a moving image and the signal processing unit 41 processes the moving image, the camera-side wireless communication unit 50 can transmit the processed image (which is also referred to as a live view image or live view image data) to the smart phone 100. In this way, the image to be recorded, such as a moving image, can be recorded in a recording medium which is provided in the smart phone 100 or an external recording medium, or a live view image can be displayed on a display panel 121 (FIG. 1) of the smart phone 100.

The camera-side operating unit 60 includes, for example, a power button and can be used to input an operation instruction similar to the operation instruction from the smart phone 100.

The camera-side display unit 61 functions as an image display unit which displays, for example, a live view image and a playback image and also functions as a user interface unit (UI unit) for displaying a menu screen and for setting and inputting various parameters, in cooperation with the camera-side operating unit 60.

A memory 62 includes, for example, a synchronous dynamic random access memory (SDRAM) serving as a storage area that temporarily stores still images or moving images or a work area that performs various types of arithmetic processing or a read only memory (ROM) that stores an imaging program and various kinds of data required for control.

(Internal Structure of Imaging Control Device)

Figure 3:
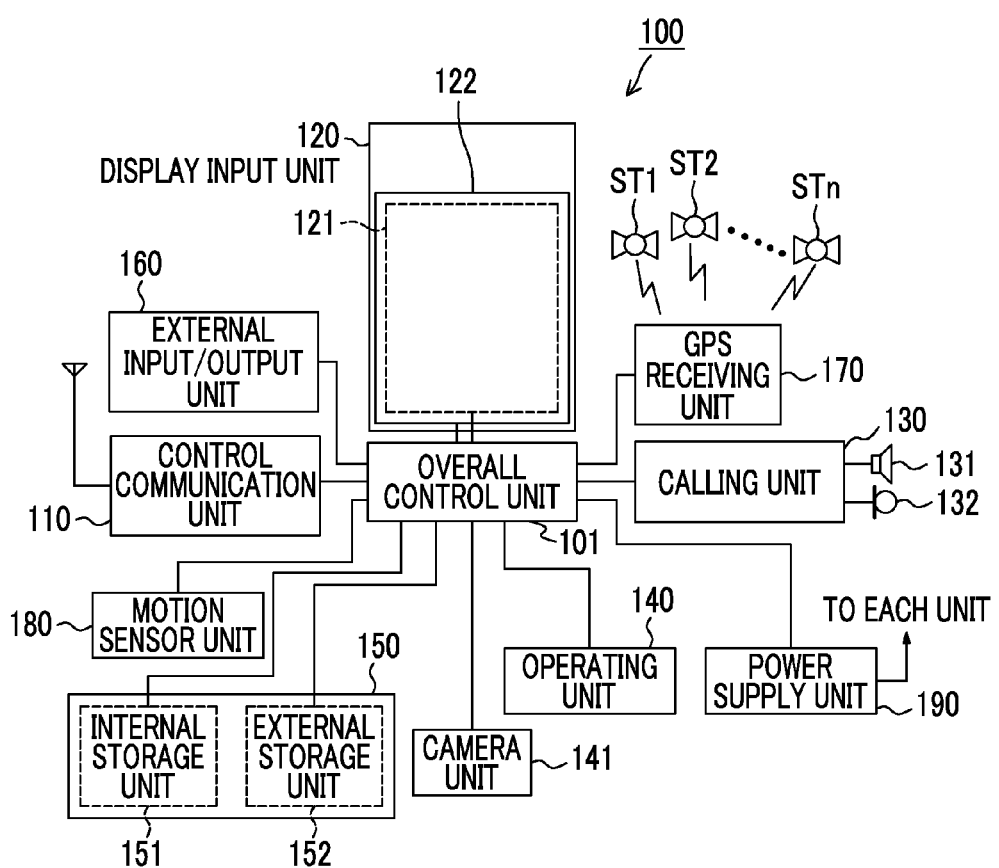
FIG. 3 is a block diagram illustrating an example of the internal structure of the imaging control device.

FIG. 3 is a block diagram illustrating an example of the internal structure of the imaging control device (smart phone) 100 illustrated in FIG. 1.

As illustrated in FIG. 3, the smart phone 100 comprises, as main components, a control communication unit 110, a display input unit 120, a calling unit 130, an operating unit 140, a camera unit 141, a storage unit 150, an external input/output unit 160, a global positioning system (GPS) receiving unit 170, a motion sensor unit 180, a power supply unit 190, and an overall control unit 101. In addition, the smart phone 100 has a wireless communication function which performs mobile wireless communication through a base station apparatus BS and a mobile communication network NW.

The control communication unit 110 performs wireless communication with the base station apparatus BS which is accommodated in the mobile communication network NW in response to an instruction from the overall control unit 101. The wireless communication is used to transmit and receive various types of file data, such as voice data and image data, and electronic mail data or to receive, for example, web data or streaming data. In this example, the control communication unit 110 of the smart phone 100 transmits various operation instruction inputs to the imaging device 10 or receives, for example, a live view image and an image obtained by a main imaging operation from the imaging device 10. In addition, the control communication unit 110 can perform wireless communication with the plurality of imaging devices 10.

The display input unit 120 displays, for example, images (still images and moving images) or text information to visually transmit information to the user and detects the user's operation for the displayed information under the control of the overall control unit 101. The display input unit (touch panel) 120 includes the display panel (display unit) 121 and an operation panel (position input unit) 122. It is preferable that the display panel 121 is a 3D display panel in a case in which a 3D image is viewed.

The display panel 121 uses, for example, a liquid crystal display (LCD) or an organic electro-luminescence display (OELD) as a display device.

The operation panel 122 is a device that is provided such that an image displayed on a display surface of the display panel 121 is visually recognized and detects one or a plurality of coordinate points operated by a finger of the user or a stylus. When the device is operated by a finger of the user or a stylus, a detection signal which is generated by the operation is output to the overall control unit 101. Then, the overall control unit 101 detects an operation position (coordinates) on the display panel 121 on the basis of the received detection signal. The display input unit 120 including the operation panel 122 also functions as an instruction receiving unit that receives instructions from the user.

As illustrated in FIG. 1, the display panel 121 and the operation panel 122 of the smart phone 100 are integrated to form the display input unit 120 and the operation panel 122 is provided so as to completely cover the display panel 121. In a case in which this structure is used, the operation panel 122 may have a function of detecting the user's operation even in a region other than the display panel 121. In other words, the operation panel 122 may comprise a detection region (hereinafter, referred to as a display region) for an overlap portion which overlaps the display panel 121 and a detection region (hereinafter, referred to as a non-display region) for an outer edge portion which does not overlap the display panel 121.

The size of the display region may be exactly equal to the size of the display panel 121. However, the sizes are not necessarily equal to each other. The operation panel 122 may comprise two sensitive regions, that is, an outer edge portion and an inner portion other than the outer edge portion. The width of the outer edge portion is appropriately designed according to, for example, the size of the housing 102. Examples of a position detecting method which is used in the operation panel 122 include a matrix switching method, a resistive film method, a surface elastic wave method, an infrared method, an electromagnetic induction method, and a capacitive sensing method. Any of the methods may be used.

The calling unit 130 comprises a speaker 131 and a microphone 132. The calling unit 130 converts the voice of the user which is input through the microphone 132 into voice data which can be processed by the overall control unit 101 and outputs the converted voice data to the overall control unit 101. In addition, the calling unit 130 decodes voice data received by the control communication unit 110 or the external input/output unit 160 and outputs the decoded voice data from the speaker 131. As illustrated in FIG. 1, for example, the speaker 131 and the microphone 132 can be mounted on the same surface as the display input unit 120.

The operating unit 140 may be a hardware key which uses, for example, a key switch or a switch which is displayed on the display input unit 120 and receives instructions from the user. For example, the operating unit 140 is a push button switch which is mounted on a lower portion and a lower surface of the display input unit 120 of the housing 102 of the smart phone 100, is turned on when it is pressed by, for example, a finger, and is turned off by the restoring force of a spring when the finger is taken off. The operating unit 140 also functions as an instruction receiving unit that receives instructions from the user.

The storage unit 150 stores a control program or control data of the overall control unit 101, address data which is associated with, for example, the names or phone numbers of communication partners, and transmitted and received electronic mail data, web data which is downloaded by web browsing, or downloaded content data. In addition, the storage unit 150 temporarily stores, for example, streaming data. The storage unit 150 includes an internal storage unit 151 which is provided in the smart phone and an external storage unit 152 which has a slot for a detachable and attachable external memory. The internal storage unit 151 and the external storage unit 152 forming the storage unit 150 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 160 functions as an interface with all of the external apparatuses connected to the smart phone 100 and is directly or indirectly connected to other external apparatuses by communication (for example, universal serial bus (USB) communication or IEEE1394) or a network (for example, the Internet, a wireless local area network (LAN), a Bluetooth (registered trademark) network, a radio frequency identification (RFID) network, an infrared data association (IrDA (registered trademark)) network, an ultra wideband (UWB) (registered trademark) network, or a ZigBee (registered trademark) network).

Examples of the external apparatus connected to the smart phone 100 include a wired/wireless headset, a wired/wireless external charger, a wired/wireless data port, a memory card which is connected through a card socket, a subscriber identity module (SIM)/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a personal digital assistant (PDA) which is connected wirelessly or in a wired manner, and an earphone. The external input/output unit 160 transmits data which is received from the external apparatus to each component of the smart phone 100 or transmits data in the smart phone 100 to the external apparatus.

The GPS receiving unit 170 receives GPS signals transmitted from GPS satellites ST1 to STn and performs a position measurement process on the basis of a plurality of received GPS signals to detect a position including the latitude, longitude, and height of the smart phone 100, in response to an instruction from the overall control unit 101. When the GPS receiving unit 170 can acquire positional information from the control communication unit 110 or the external input/output unit 160 (for example, a wireless LAN), it can detect the position using the positional information.

The motion sensor unit 180 comprises, for example, a triaxial acceleration sensor and detects the physical movement of the smart phone 100 in response to an instruction from the overall control unit 101. When the physical movement of the smart phone 100 is detected, the moving direction or acceleration of the smart phone 100 is detected. The detection result is output to the overall control unit 101.

The power supply unit 190 supplies power which is stored in a battery (not illustrated) to each unit of the smart phone 100 in response to an instruction from the overall control unit 101.

The overall control unit 101 comprises a microprocessor, operates on the basis of the control program or control data stored in the storage unit 150, and controls the overall operation of each unit of the smart phone 100. The overall control unit 101 has an application processing function and a mobile communication control function of controlling each unit of a communication system in order to perform voice communication or data communication through the control communication unit 110.

The application processing function is implemented by the operation of the overall control unit 101 based on the application software which is stored in the storage unit 150. Examples of the application processing function include an infrared communication function which controls the external input/output unit 160 such that data communication with an opposing apparatus is performed, an electronic mail function which transmits and receives electronic mail, and a web browsing function which browses web pages.

The overall control unit 101 has, for example, an image processing function that displays an image on the display input unit 120 on the basis of image data (still image or moving image data) such as received data or downloaded streaming data. The image processing function means the function of the overall control unit 101 decoding image data, performing image processing for the decoding result, and displaying an image on the display panel 121 of the display input unit 120.

The overall control unit 101 performs display control for the display panel 121 and operation detection control for detecting the operation of the user through the operation unit 140 and the operation panel 122.

The overall control unit 101 performs display control to display a software key, such as an icon for starting application software or a scroll bar, or to display a window for creating electronic mail. The scroll bar means a software key for receiving an instruction to move a displayed portion of an image that is too large to fit into the display region of the display panel 121.

The overall control unit 101 performs operation detection control to detect the operation of the user through the operating unit 140 and the operation panel 122.

The overall control unit 101 performs the operation detection control to detect the operation of the user through the operating unit 140, to receive an operation for the icon or the input of a character string to an input field of the window through the operation panel 122, or to receive a request to scroll the displayed image through the scroll bar.

The overall control unit 101 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The overall control unit 101 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera which captures an electronic image (captures an image) using an imaging element such as a complementary metal oxide semiconductor (CMOS) or a charge-coupled device (CCD).

The camera unit 141 can convert captured image data into image data which is compressed in, for example, a Joint Photographic Coding Experts Group (JPEG) format and record the converted image data in the storage unit 150 or output the converted image data through the external input/output unit 160 or the control communication unit 110, under the control of the overall control unit 101.

In the smart phone 100 illustrated in FIG. 1, the camera unit 141 is mounted on the same surface as the display input unit 120. However, the mounting position of the camera unit 141 is not limited thereto. For example, the camera unit 141 may be mounted on the rear surface of the display input unit 120 or a plurality of camera units 141 may be mounted. In a case in which a plurality of camera units 141 are mounted, the camera units 141 which are used to capture images may be switched such that a single camera unit captures images or the plurality of camera units 141 may be simultaneously used to capture images.

The camera unit 141 can be used for various functions of the smart phone 100. For example, the live view image captured by the camera unit 141 or the image which is captured by the main imaging operation can be displayed on the display panel 121, or the image captured by the camera unit 141 can be used as one of the operation inputs of the operation panel 122. When detecting the position, the GPS receiving unit 170 may detect the position with reference to the image from the camera unit 141. In addition, the optical axis direction of the camera unit 141 in the smart phone 100 may be determined or the current usage environment may be determined, with reference to the image from the camera unit 141, using the triaxial acceleration sensor or without using the triaxial acceleration sensor. Of course, the image from the camera unit 141 may be used in the application software.

In this example, application software for operating the imaging device 10 is downloaded through, for example, a network and is stored in the storage unit 150. The overall control unit 101 is operated by the application processing function of the smart phone 100 according to the downloaded application software to make the general-purpose smart phone 100 function as a user interface unit (UI unit) for operating the imaging device 10.

Next, the control of a plurality of imaging devices 10 will be described.

Figure 4:
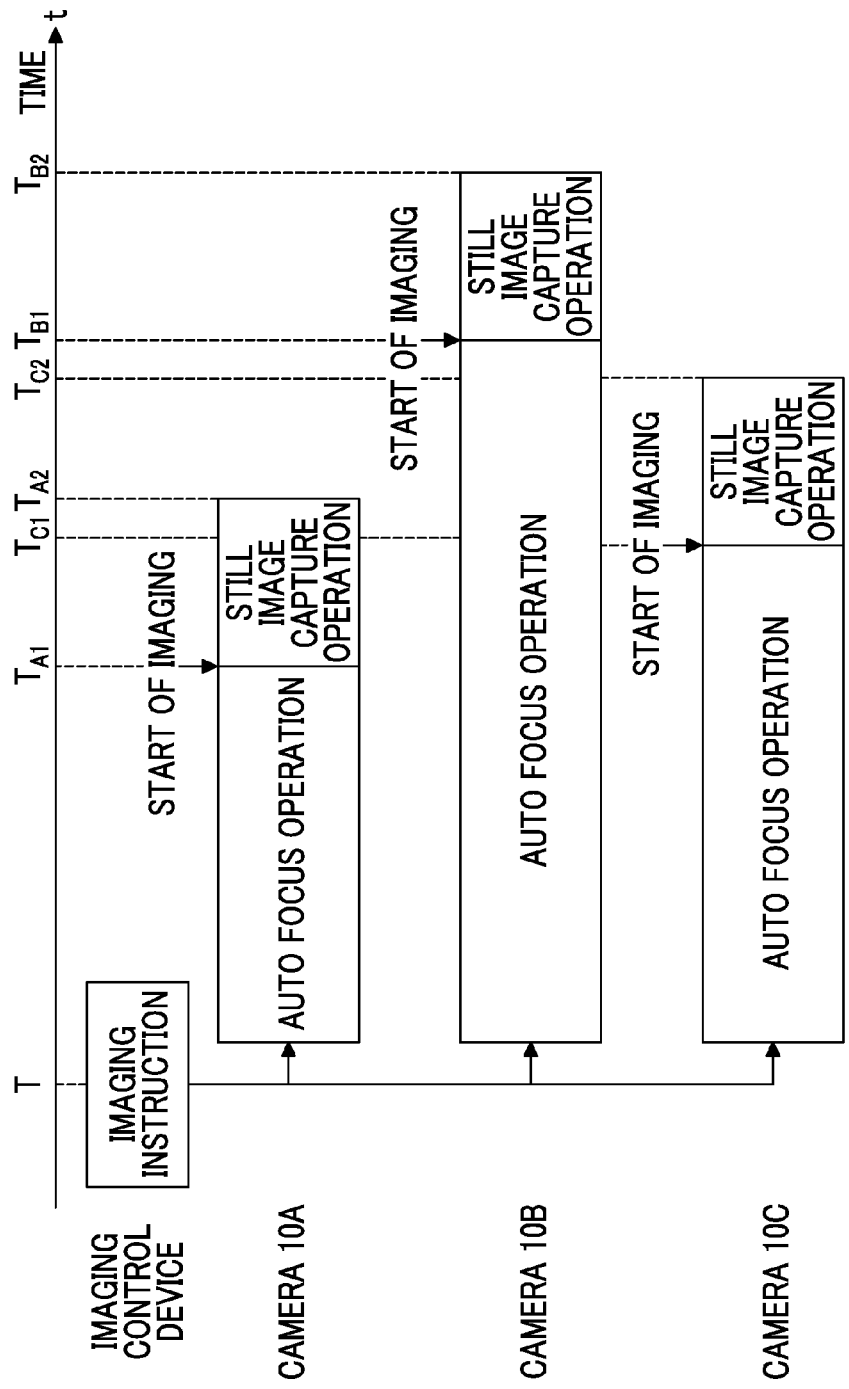
FIG. 4 is a diagram illustrating the control of a plurality of imaging devices in the related art.

FIG. 4 is a diagram illustrating the control of a plurality of imaging devices 10 (cameras 10A, 10B, and 10C in FIG. 4) in the related art. In FIG. 4, the horizontal axis indicates time t and a series of imaging operations of the cameras 10A, 10B, and 10C controlled by the smart phone (imaging control device) 100 is illustrated.

When the smart phone 100 transmits an imaging instruction to the cameras 10A to 10C, each of the cameras 10A to 10C performs an auto focus operation and a still image capture operation.

The cameras 10A to 10C receive the imaging instruction from the smart phone 100 substantially at the same time T. However, since the cameras 10A to 10C require different auto focus operation times, the still image capture operations of the cameras 10A to 10C are completed at different times.

In the camera 10A, the auto focus operation ends at a time $T_{A1}$ and the still image capture operation ends at a time $T_{A2}$. In the camera 10B, the auto focus operation ends at a time $T_{B1}$ and the still image capture operation ends at a time $T_{B2}$. In the camera 10C, the auto focus operation ends at a time $T_{C1}$ and the still image capture operation ends a time $T_{C2}$. Therefore, in FIG. 4, when the still image capture operation is performed after the auto focus operation is completed, the cameras 10A, 10B, and 10C have different imaging times.

Here, as described above, the auto focus operation is performed at different times due to, for example, the difference between the objects captured by the cameras or a difference in how the object is viewed through each camera, a difference between the types of cameras, or the state of a lens or a difference between the types of lenses.

For example, when the cameras 10B and 10C are forcibly switched to the still image capture operation at the time ($T_{A1}$) the auto focus operation of the camera 10A ends, the camera 10B and the camera 10C need to acquire images in a state in which the auto focus operation does not end (a state in which preparation for imaging is not completed). As a result, an inappropriate image, such as a defocused image, is obtained. Therefore, in the invention, the above-mentioned problems are solved as follows.

Figure 5:
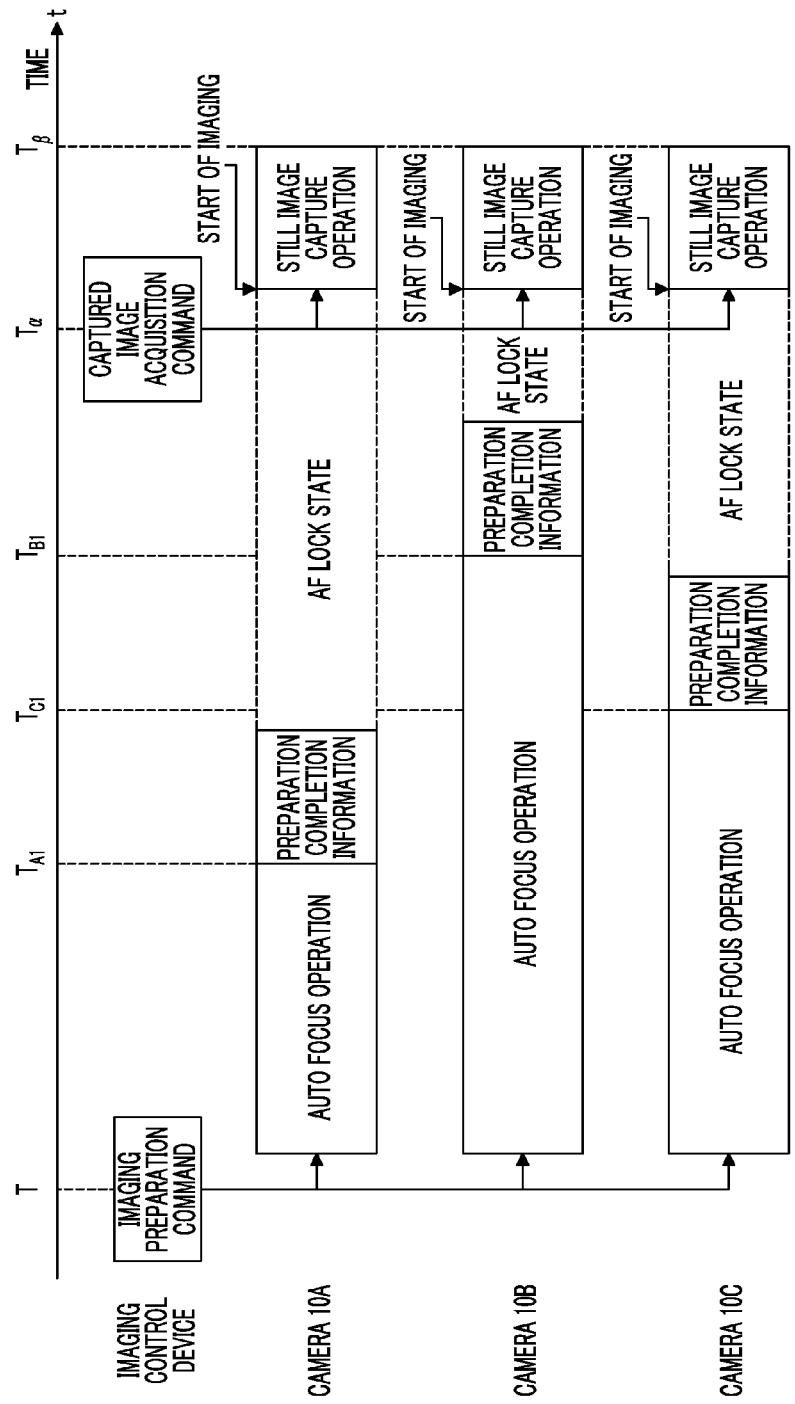
FIG. 5 is a diagram illustrating the control of a plurality of imaging devices in an example of the invention.

FIG. 5 is a diagram illustrating the control of a plurality of imaging devices 10 in the invention. FIG. 5 illustrates a case in which the same cameras 10A to 10C as those illustrated in FIG. 4. The time (T) when an imaging preparation command is received is equal to the auto focus operation end times ($T_{A1}$, $T_{B1}$, and $T_{C1}$).

The smart phone 100 transmits an imaging preparation command to prepare imaging to the cameras 10A to 10C through the control communication unit 110 at the time T. The camera 10A receives the imaging preparation command, starts the auto focus operation, and ends the auto focus operation at the time $T_{A1}$. Then, the camera 10A transmits preparation completion information indicating the completion of preparation for imaging to the smart phone 100 and maintains an auto focus lock state such that a focus state is maintained. Similar to the camera 10A, the camera 10B and the camera 10C complete the auto focus operation in response to the imaging preparation command and maintain the auto focus lock state.

After receiving the preparation completion information from the cameras 10A to 10C, the smart phone 100 transmits a captured image acquisition command to acquire a captured image to the cameras 10A to 10C (time $T_\alpha$). Then, all of the cameras 10A to 10C start the still image capture operation and end the still image capture operation (time $T_\beta$) to capture a synchronous image.

As such, in this embodiment, the smart phone 100 receives the preparation completion information from all of the cameras to be controlled and transmits the captured image acquisition command to all of the cameras to be controlled. Therefore, the camera to be controlled can acquire captured images (acquisition process) in an auto focus state and imaging is synchronously performed between the cameras.

In this embodiment, the auto focus operation (focus adjustment) has been described as an example of the preparation for imaging and a case in which the preparation completion information is information related to the completion of the auto focus operation has been described. However, the content of the preparation for imaging is not particularly limited. For example, the preparation completion information may include all information related to preparation for imaging, such as focus lock, auto exposure, or auto white balance.

(Display Mode of Imaging Control Device)

Next, the display mode of the smart phone (imaging control device) 100 will be described.

Figure 6:
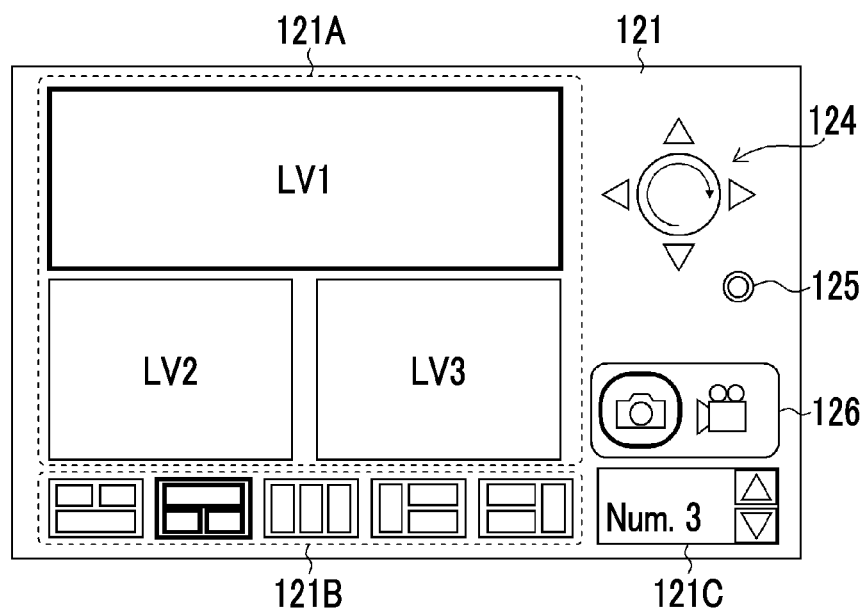
FIG. 6 is a diagram illustrating an example of the display mode of a smart phone.

FIG. 6 is a diagram illustrating an example of the display mode of the display panel 121 of the display input unit 120 of the smart phone 100.

The smart phone 100 has the display input unit 120 including the display panel 121 and the operation panel 122 (see FIG. 3) and a panel surface of the display panel 121 is a display screen.

As illustrated in FIG. 6, the display panel 121 is provided with a display region 121A in which a live view image is displayed, a display region 121B in which an icon button indicating a live view layout is displayed, and a display region 121C in which a dialogue box including up-down control for setting the number of cameras that captures a live view is displayed. In addition, a multi-function cross key 124 including icons indicating up, down, left, and right arrow keys and a center key, an imaging start button (icon button) 125 for instructing the start of imaging, and a selection button (icon button) 126 for selecting whether to capture a still image or a moving image are displayed on the display panel 121.

The overall control unit 101 displays the live view images which have been received from the cameras 10A to 10C through the control communication unit 110 in the display region 121A of the display panel 121.

In this case, the overall control unit 101 displays the live view images in the display region 121A of the display panel 121 according to a layout which is selected by the icon button indicating the layout displayed in the display region 121B. In the example illustrated in FIG. 6, a second icon button (an icon button represented by a thick frame) from the left side among the icon buttons indicating five layouts is operated to select the layout indicated by the second icon button from the left side. Therefore, the overall control unit 101 displays two live view images in the display region 121A of the display panel 121 according to the layout indicated by the second icon button from the left side.

The number in the dialogue box displayed in the display region 121C of the display panel 121 is increased or decreased by up-down control to select the number of cameras used to capture images. In addition, the icon buttons indicating the layouts displayed in the display region 121B varies depending on the number of selected cameras. The number of cameras and the layout of the images corresponding to the number of cameras will be described in detail below.

When any one of the live view images displayed in the display region 121A of the display panel 121 is touched, the frame of the touched live view image is displayed so as to be highlighted (the touched live view image is represented by a thick frame) and it is possible to remotely control the individual camera that transmits the live view image represented by the thick frame.

The imaging start button 125 is an example of the operation unit 140 and may be a hardware button of the smart phone 100 as illustrated in FIG. 1. Alternatively, as illustrated in FIG. 6, the imaging start button 125 displayed on the display screen may be used. The imaging start button 125 may function as an instruction receiving unit that transmits the imaging preparation command and the captured image acquisition command. An instruction receiving unit that receives instructions from the user may be provided separately from the imaging start button 125. An example of the instruction receiving unit will be described in detail below.

When the imaging start button 125 is touched once, the overall control unit 101 outputs an imaging start instruction (captured image acquisition command) for a plurality of cameras 10A to 10C communicating with the smart phone 100 to start capturing moving images at the same time. When the imaging start button 125 is touched once again, the overall control unit 101 outputs an imaging stop instruction for the plurality of cameras 10A to 10C to stop capturing moving images at the same time.

Next, the type of layout corresponding to the number of cameras will be described.

Figure 7:
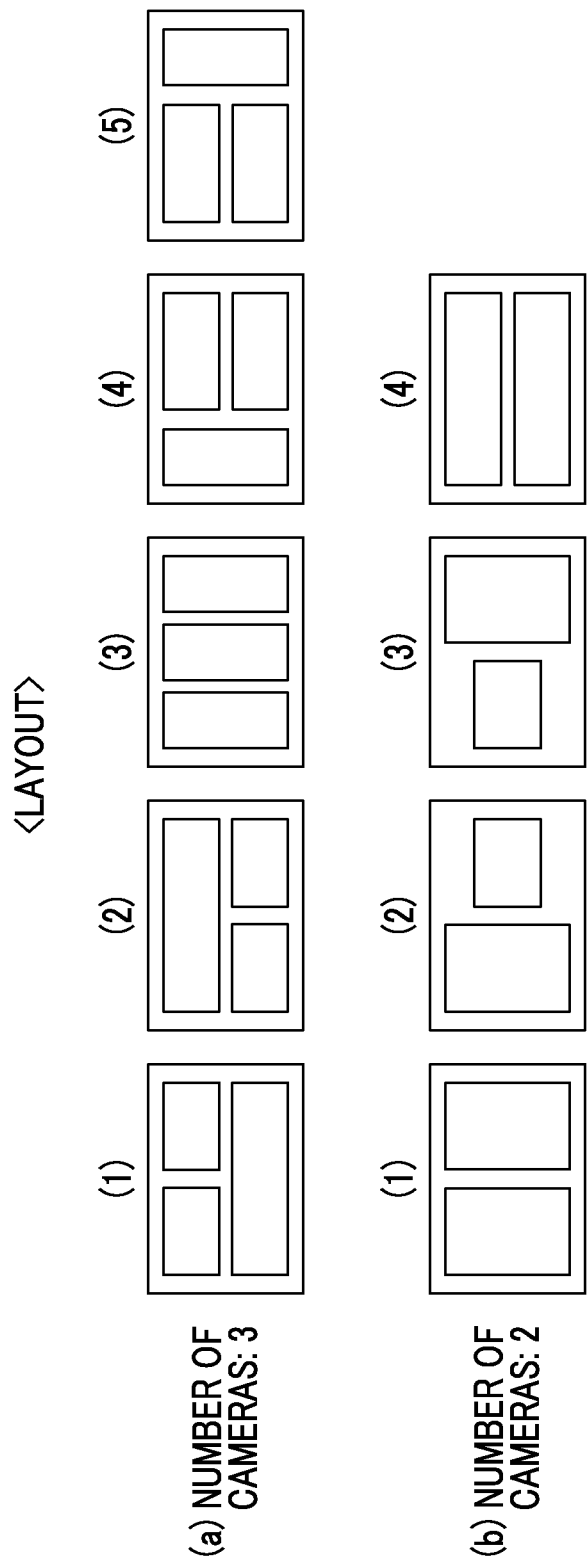
FIG. 7 is a diagram illustrating layouts.

FIG. 7 is a diagram illustrating the layouts which can be selected in a case in which the number of cameras is three and a case in which the number of cameras is two.

As illustrated in (a) of FIG. 7, in a case in which the number of cameras is three, it is possible to select one of five layouts (1) to (5). The icon buttons indicating the layouts which are displayed in the display region 121B of the display panel 121 illustrated in FIG. 6 indicate the five layouts (1) to (5) illustrated in (a) of FIG. 7 and a case in which the layout (2) is selected.

Among the five layouts illustrated in (a) of FIG. 7, the layout (1) and the layout (2) are different from each other in that the position of images is reversed in the vertical direction. In the layout (3), three images which are vertically trimmed are arranged in the horizontal direction. In the layout (4), one image which is vertically trimmed is disposed at an image position on the left side of the display region 121B and two images which are horizontally trimmed are disposed at the upper and lower image positions on the right side of the display region 121B. The layout (5) is obtained by reversing the image position of the layout (4) in the horizontal direction.

In a case in which the number of cameras is two as illustrated in (b) of FIG. 7, it is possible to select one layout from four layouts (1) to (4).

Among four layouts illustrated in (b) of FIG. 7, in the layout (1), two images which are vertically trimmed are arranged in the horizontal direction. In the layout (2), one image which is vertically trimmed is disposed at an image position on the left side of the display region 121B and one image which is not trimmed is disposed at an image position on the right side of the display region 121B. The layout (3) is obtained by reversing the image position of the layout (2) in the horizontal direction. In the layout (4), two images which are horizontally trimmed are arranged in the vertical direction.

As such, when the number of cameras is specified and a number indicating the layout is specified, it is possible to specify the layout of one or a plurality of images. However, a serial number may be used as the number indicating the layout, regardless of the number of cameras. In this case, it is possible to specify the layout of one or a plurality of images from the number indicating the layout.

Next, a method for setting the position of one or a plurality of live view images displayed in the selected layout will be described.

FIG. 9 is an enlarged view illustrating a case in which three live view images are displayed in the display region 121A of the display panel 121.

As illustrated in (a) of FIG. 9, three live view images LV1, LV2, and LV3 are displayed in the display region 121A of the display panel 121 according to the selected layout (in this example, the layout (2) illustrated in (a) of FIG. 7).

Here, it is assumed that the live view image LV1 is acquired from the camera unit 141 and the live view images LV2 and LV3 are received from the imaging device 10.

Among the live view images LV1, LV2, and LV3 displayed according to the layout, the live view image LV1 is obtained by trimming the upper and lower regions of a captured image, has a high aspect ratio, and is displayed in the upper half (image position) of the display region 121A.

The live view images LV2 and LV3 are not trimmed and are displayed in the left and right regions (image position) of the lower half of the display region 121A.

In general, a trimming process which cuts out an image with an aspect ratio from one live view image cuts out a central portion of one image. However, a trimming frame with a high or low aspect ratio may be displayed in a state in which one entire image is displayed and the trimming frame may be moved by a touch to cut out an image, of which the arbitrary position is trimmed, from the image.

In a case in which the positions of the live view images LV1 and LV2 in the layout are interchanged in (a) of FIG. 9, a swipe operation which touches the live view image LV2 and moves the position of the live view image LV2 to the position of the live view image LV1 is performed. The positions of the live view images LV1 and LV2 can be interchanged by the swipe operation as illustrated in (b) of FIG. 9.

With the movement of the image position, the live view image LV1 is changed to an image which is not trimmed and the live view image LV2 is changed to an image which is horizontally trimmed. In addition, a swipe operation which touches the live view image LV1 and moves the position of the live view image LV1 to the position of the live view image LV2 is performed is performed to interchange the positions of the live view images LV1 and LV2, similarly to the above.

As illustrated in FIG. 8, there are six combinations of image positions which are obtained in a case in which the positions of three live view images LV1 to LV3 in the above-mentioned layout are interchanged. Hereinafter, it is assumed that the six combinations are specified by image position numbers (1) to (6).

In a case in which the number of cameras is three, even if any of the layouts is selected, there are six combinations of the positions of three images. In a case in which the number of cameras is two, the number of combinations of the positions of images obtained when the positions of two images are interchanged is two.

FIG. 10 is an enlarged view illustrating the display region 121A of the display panel 121 and particularly illustrates a case in which one live view image is selected.

In the example illustrated in (a) of FIG. 10, the live view image LV1 corresponding to a selected camera is displayed on a large screen and two live view images LV2 and LV3 corresponding to the cameras which communicate with the smart phone, but are not selected are displayed on small screens.

In (a) of FIG. 10, a swipe operation which touches the live view image LV1 and moves the live view image LV1 to the position of the live view image LV2 is performed in order to switch the selected live view image LV1 to the live view image LV2 (in a case in which the live view image LV2 is selected). As illustrated in (b) of FIG. 10, the selected live view image LV1 can be switched to the live view image LV2 by the swipe operation.

In addition, a swipe operation which touches the live view image LV2 and moves the live view image LV2 to the position of the live view image LV1 is performed to interchange the positions of the live view images LV1 and LV2 (to select the live view image), similarly to the above.

Figure 11:
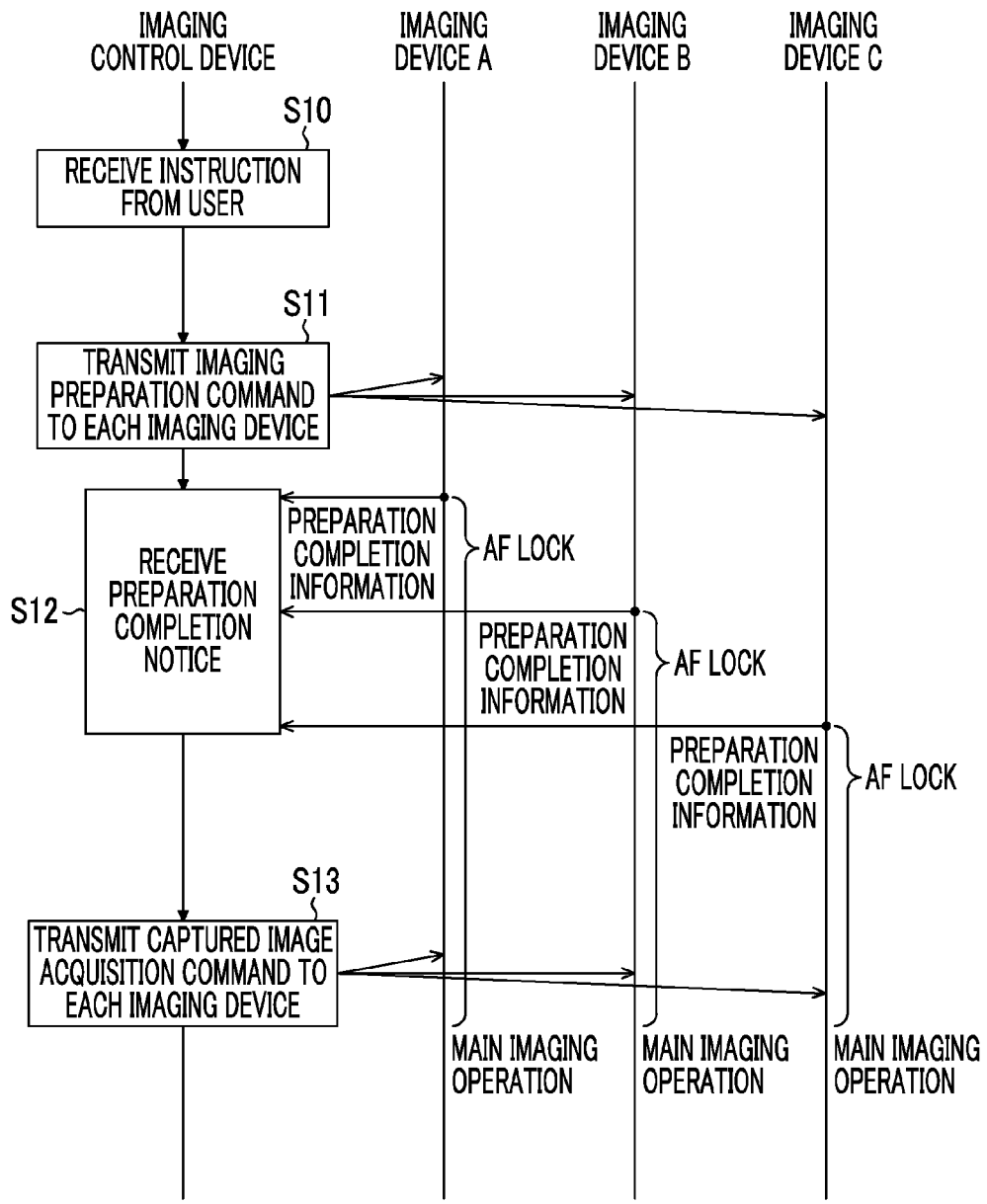
FIG. 11 is a flowchart illustrating the operation of the smart phone.

FIG. 11 is a flowchart illustrating the operation of the smart phone 100.

First, the smart phone 100 receives an instruction from the user through the operation unit 140 which functions as the instruction receiving unit or the display input unit 120 (Step S10: an instruction reception step). Then, the overall control unit 101 of the smart phone 100 transmits an imaging preparation command to prepare imaging to each of a plurality of imaging devices 10 (imaging devices A to C) through the control communication unit 110, in response to the received instruction (Step S11: an imaging preparation command transmission step). Then, when receiving the imaging preparation command, the imaging devices A to C perform an imaging preparation operation. When the imaging preparation operation is completed, the imaging devices A to C transmit preparation completion information to the smart phone 100.

Then, the overall control unit 101 of the smart phone 100 receives the preparation completion information indicating the completion of the preparation for imaging from each of the imaging devices A to C through the control communication unit 110 (Step S12: a preparation completion information receiving step). Then, the overall control unit 101 of the smart phone 100 transmits a captured image acquisition command to the plurality of imaging devices 10 (Step S13: a captured image acquisition command transmission step). The invention can also be implemented by a program that causes a computer to perform each step of the above-mentioned flowchart. In this case, the program can be stored in a computer-readable storage medium.

As described above, in this embodiment, the smart phone 100 receives the preparation completion information indicating the completion of preparation for imaging from each of the plurality of imaging devices 10 and transmits the captured image acquisition command to each of the plurality of imaging devices 10. Therefore, it is possible to synchronize the imaging times of the plurality of imaging devices 10 and each of the plurality of imaging devices 10 can acquire appropriate images after preparation for imaging is completed.

Second Embodiment

Next, a second embodiment of the invention will be described. In this embodiment, when receiving preparation completion information from all of the imaging devices 10, the smart phone (imaging control device) 100 transmits a captured image acquisition command, without waiting for instructions from the user.

Figure 12:
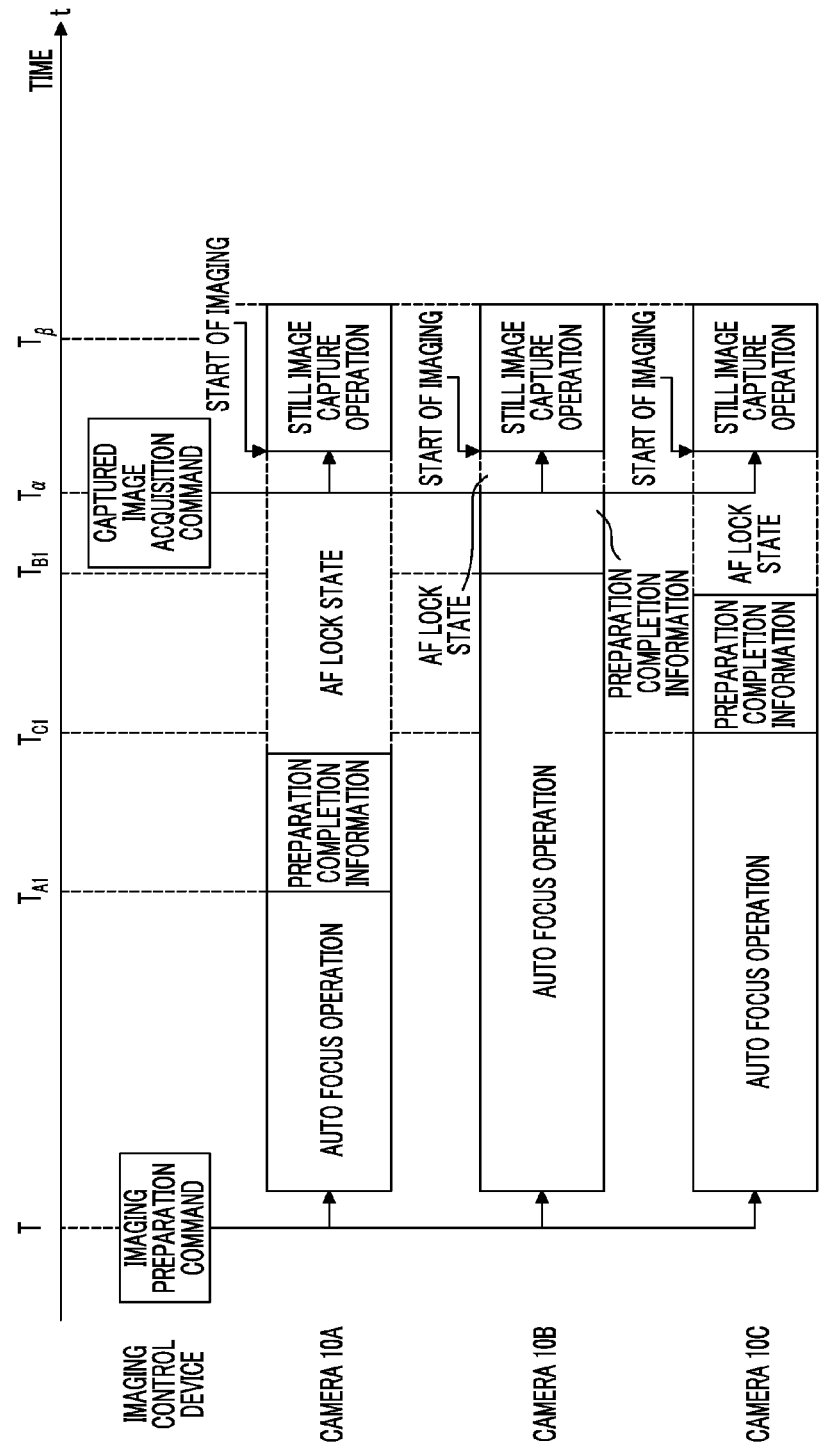
FIG. 12 is a diagram illustrating a second embodiment.

FIG. 12 is a diagram illustrating the control of a plurality of imaging devices 10 by the smart phone 100 in this embodiment. The same components as those illustrated in FIG. 5 are denoted by the same reference numerals and the description thereof will not be repeated.

FIG. 12 illustrates a case in which an image acquisition instruction unit receives an instruction before preparation completion information is received. In a case in which the image acquisition instruction unit receives an instruction before the preparation completion information is received from all or some of the imaging devices 10, the overall control unit 101 of the smart phone 100 transmits a captured image acquisition command to the imaging devices 10 after receiving the preparation completion information from all of the imaging device 10.

The camera 10A receives the imaging preparation command and completes the auto focus operation at a time $T_{A1}$. The camera 10C receives the imaging preparation command and completes the auto focus operation at a time $T_{C1}$. The camera 10B receives the imaging preparation command and completes the auto focus operation at the latest time $T_{B1}$. Then, when receiving preparation completion information from the cameras 10A to 10C, the overall control unit 101 of the smart phone 100 automatically transmits the captured image acquisition command.

As such, in this embodiment, immediately after the cameras 10A to 10C transmit imaging preparation completion information to the smart phone 100, the smart phone 100 transmits the captured image acquisition command. Therefore, in this embodiment, immediately after the cameras 10A to 10C complete preparation for imaging, an imaging operation is performed. Therefore, imaging is performed at an appropriate time to capture images.

Third Embodiment

Next, a third embodiment will be described. In this embodiment, after an auto focus operation ends, each of a plurality of imaging devices 10 performs a high-speed burst capture and uses an image which is captured at a specific time as a synchronous image.

Figure 13:
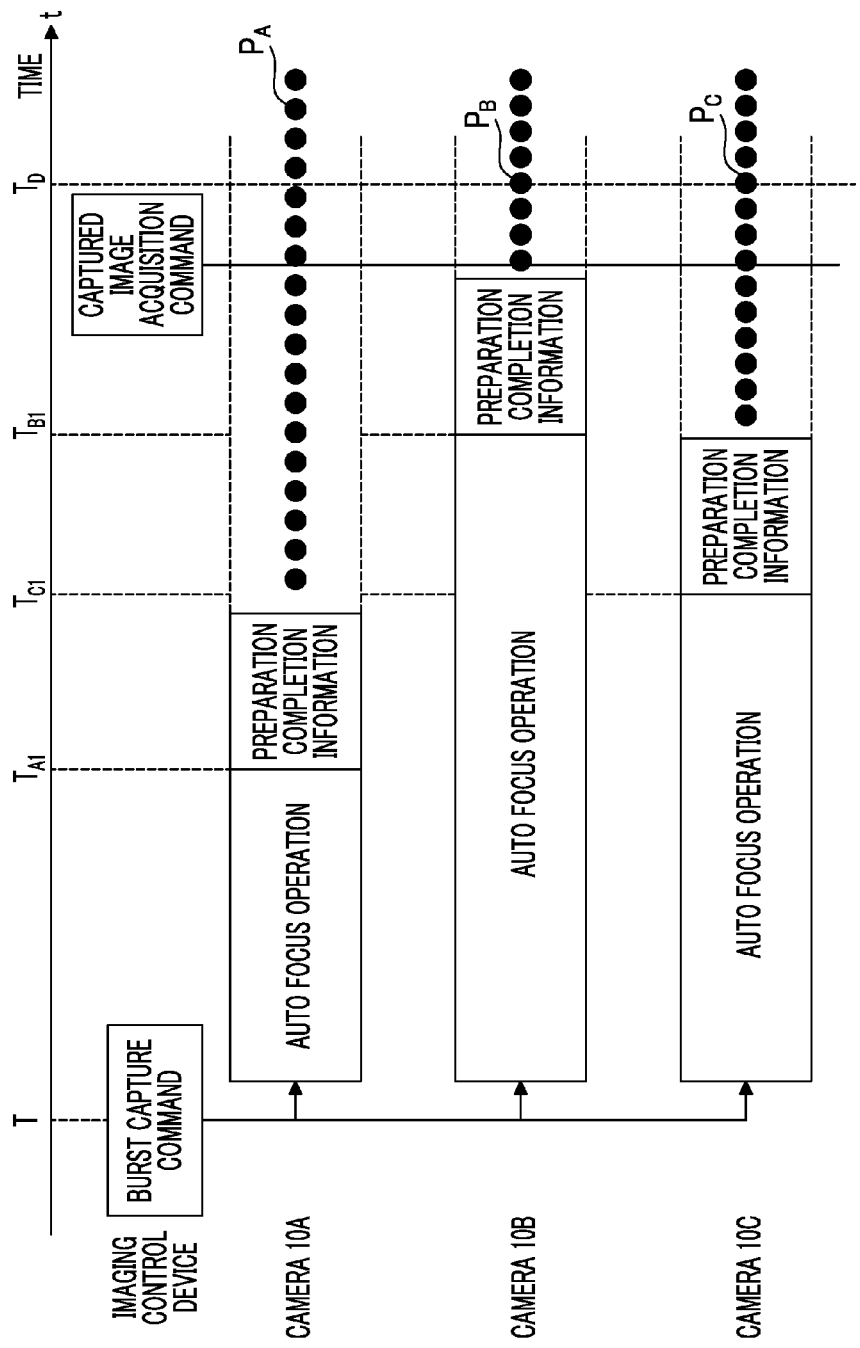
FIG. 13 is a diagram illustrating a third embodiment.

FIG. 13 is a diagram illustrating the control of a plurality of imaging devices 10 by the smart phone 100 in this embodiment. The same components as those illustrated in FIG. 5 are denoted by the same reference numerals and the description thereof will not be repeated.

In the case illustrated in FIG. 13, the overall control unit 101 of the smart phone 100 transmits a burst capture command to perform a burst capture after the completion of preparation for imaging to the cameras 10A to 10C. When receiving the burst capture command, the cameras 10A to 10C sequentially performs a high-speed burst capture after completing an auto focus operation. Here, the high-speed burst capture means, for example, 60 imaging operations per second. In FIG. 13, consecutive black circles after the auto focus operation is completed conceptually indicate continuous imaging and it is assumed that one image is captured for one black circle.

When receiving preparation completion information from the cameras 10A to 10C, the smart phone 100 transmits a captured image acquisition command to the cameras 10A to 10C. In this case, the captured image acquisition command includes imaging time information indicating the imaging time of an image which is used as a synchronous image among the images acquired by the burst capture operation of the cameras 10A to 10C. In the case illustrated in FIG. 13, the captured image acquisition command includes information about the use of an image captured at a time $T_D$ as the synchronous image. Among the images acquired by the burst capture operation of the cameras 10A to 10C, an image close to the time $T_D$ is used as the synchronous image. That is, an image $P_A$ captured by the camera 10A, an image $P_B$ captured by the camera 10B, and an image $P_C$ captured by the camera 10C are used as the synchronous image.

As such, in this embodiment, the synchronous image can be acquired by the burst capture operation of the cameras 10A to 10C. Therefore, according to this aspect, immediately after preparation for imaging is completed, an image is acquired. As a result, the user can acquire images without missing a shutter chance.

Fourth Embodiment

Next, a fourth embodiment will be described. In this embodiment, each of a plurality of imaging devices 10 prepares imaging again on the basis of an instruction from the smart phone (imaging control device) 100.

After preparation completion information is received from the imaging devices 10, the overall control unit 101 of the smart phone 100 may display a third command image indicating an instruction to prepare imaging again on the display panel 121. Then, when a position corresponding to the third command image in the display input unit 120 is touched, the overall control unit 101 of the smart phone 100 transmits a re-preparation command to prepare imaging again to each of the plurality of imaging devices 10 through the control communication unit 110. Then, when receiving the re-preparation command, the imaging devices 10 complete preparation for imaging again and transmit preparation completion information to the smart phone 100.

The third command image may be displayed so as to be associated with all of the imaging devices 10 which communicate with the smart phone 100. That is, the third command image related to the camera 10A among the imaging devices 10, the third command image related to the camera 10B among the imaging devices 10, and the third command image related to the camera 10C among the imaging devices 10 may be separately displayed on the display panel 121. Then, in a case in which any one of the third command images related to the cameras 10A to 10C is touched, the overall control unit 101 of the smart phone 100 transmits the re-preparation command to the camera associated with the touched third command image. In addition, the third command image indicating the instruction to prepare imaging again may be the live view image described in FIG. 6. That is, when the user touches any one of the live view images captured by the imaging devices 10, the re-preparation command may be transmitted to the imaging device 10 that has transmitted the touched live view image.

OTHER EMBODIMENTS (Application Examples)

As described above, the user can operate a plurality of imaging devices 10 through the smart phone (imaging control device) 100. The overall control unit 101 of the smart phone 100 transmits and receives information related to the state of each imaging device 10, such as imaging conditions, to and from the camera-side control unit 40 (for example, the imaging element control unit 42) of each imaging device 10. Therefore, the overall control unit 101 can display information corresponding to the imaging state of each imaging device 10 on the display panel 121 to assist a photographing control operation of the user or can control an imaging operation, such as the focus state of other imaging devices 10, on the basis of information related to the state of one of a plurality of imaging devices 10 or the plurality of imaging devices 10.

For example, in a case in which at least one of the plurality of imaging devices 10 is in a pan focus state, the overall control unit 101 may control the focus state of other imaging devices 10 such that the imaging devices 10 are changed to the pan focus state. For example, in a state in which the user touches a position (operation panel 122) where the live view image captured by the imaging device 10 that is in the pan focus state displayed in a state in which the live view images captured by each imaging device 10 are displayed on the display panel 121 of the smart phone 100, the overall control unit 101 may output an "imaging preparation command to adjust the imaging device to the pan focus state" to the camera-side control units 40 of other imaging devices 10.

In a case in which the plurality of imaging devices 10 include a pan/tilt camera and the pan/tilt camera is in a mode in which the pan/tilt camera tracks a specific target, the overall control unit 101 may output an "imaging preparation command to capture images in the mode in which the specific target is tracked" to the camera-side control units 40 of other imaging devices 10. Therefore, for example, in a case in which the pan/tilt camera included in the plurality of imaging devices 10 is in a face tracking mode", the overall control unit 101 may output an "imaging preparation command to capture images in the face tracking mode" to the camera-side control units 40 of other imaging devices 10.

In a case in which the plurality of imaging devices 10 include an imaging device 10 using a manual focus mode and a live view image captured by the imaging device 10 using the manual focus mode is displayed on the display panel 121 of the smart phone 100, the overall control unit 101 may display information indicating an in-focus position on the display panel 121 together with the live view image to assist a photographing operation of the user. Therefore, the overall control unit 101 can display an in-focus position only in the live view image captured by the imaging device 10 using the manual focus mode on the display panel 121, using a picking display process.

The overall control unit 101 of the smart phone (imaging control device) 100 may determine the imaging mode and imaging conditions of each imaging device 10 while giving priority to the imaging mode and the imaging conditions which are set in each imaging device 10. In this case, the user can operate the smart phone 100 to capture a desired image using each imaging device 10, without directly operating each imaging device 10. For example, in a case in which each imaging device 10 comprises a physical switch (for example, a focus dial) that can switch the focus mode between, for example, a single AF (S-AF) mode, a continuous AF (C-AF) mode, and a manual focus (MF) mode, the user can operate the smart phone 100 to change the focus mode of each imaging device 10, regardless of the mode set by the physical switch. Therefore, in a case in which the focus mode set by the physical switch is not common to the plurality of imaging devices 10, the user can operate the smart phone 100 to collectively set the focus modes (imaging conditions) of the plurality of imaging devices 10.

In the above-described embodiments, an example in which a plurality of imaging devices 10 are provided separately from the smart phone (imaging control device) 100 has been mainly described. However, the invention is not limited thereto. One or a plurality of cameras (internal imaging devices 10) which are provided integrally with the smart phone (imaging control device) 100 may be included in the "plurality of imaging devices 10".

(Error Display)

Next, a case in which an error is displayed on the display panel 121 of the display input unit 120 in the smart phone 100 to notify the user of the occurrence of the error will be described.

Figure 14:
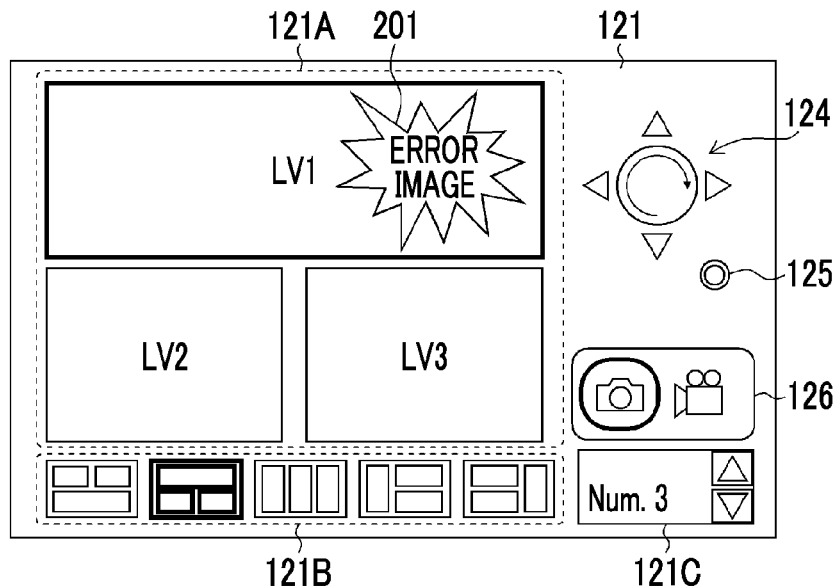
FIG. 14 is a diagram illustrating the display of an error.

FIG. 14 is a conceptual diagram illustrating a display mode of the smart phone 100 when an error is displayed. The same components as those described in FIG. 6 are denoted by the same reference numerals and the description thereof will not be repeated.

In the case illustrated in FIG. 14, the overall control unit 101 of the smart phone 100 receives error notification information indicating an error from the camera 10A which captures the image LV1 through the control communication unit 110. Then, the overall control unit 101 displays an error image 201 on the display panel 121 of the display input unit 120. In addition, the overall control unit 101 may display an error image on the live view image captured by the camera which corresponds to error notification information such that the user can intuitively recognize the error, as illustrated in FIG. 14. Here, the error means various defects. For example, the error means an error indicating the problem in preparation for imaging in the imaging device 10 or an error indicating the mechanical problem of the imaging device 10.

The overall control unit 101 of the smart phone 100 may not transmit the captured image acquisition command to the imaging device 10 in which an error has occurred. That is, the overall control unit 101 of the smart phone 100 may not direct the imaging device 10 in which an error has occurred to acquire images and may direct only the normal imaging devices 10 to acquire appropriate images.

(Instruction Receiving Unit on Touch Panel)

Next, a modification example of the instruction receiving unit displayed on the display panel 121 of the display input unit 120 will be described.

Figure 15:
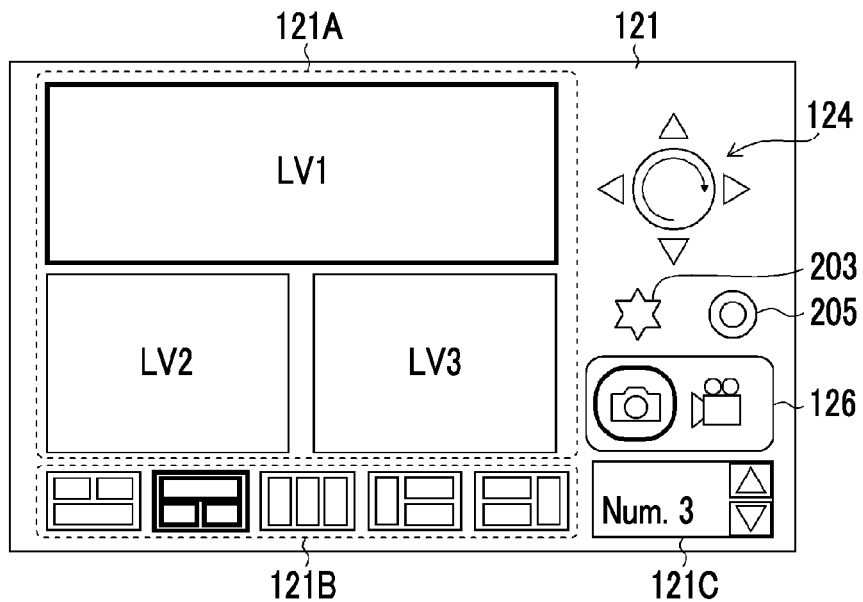
FIG. 15 is a diagram illustrating the display of an instruction receiving unit.
Figure 16:
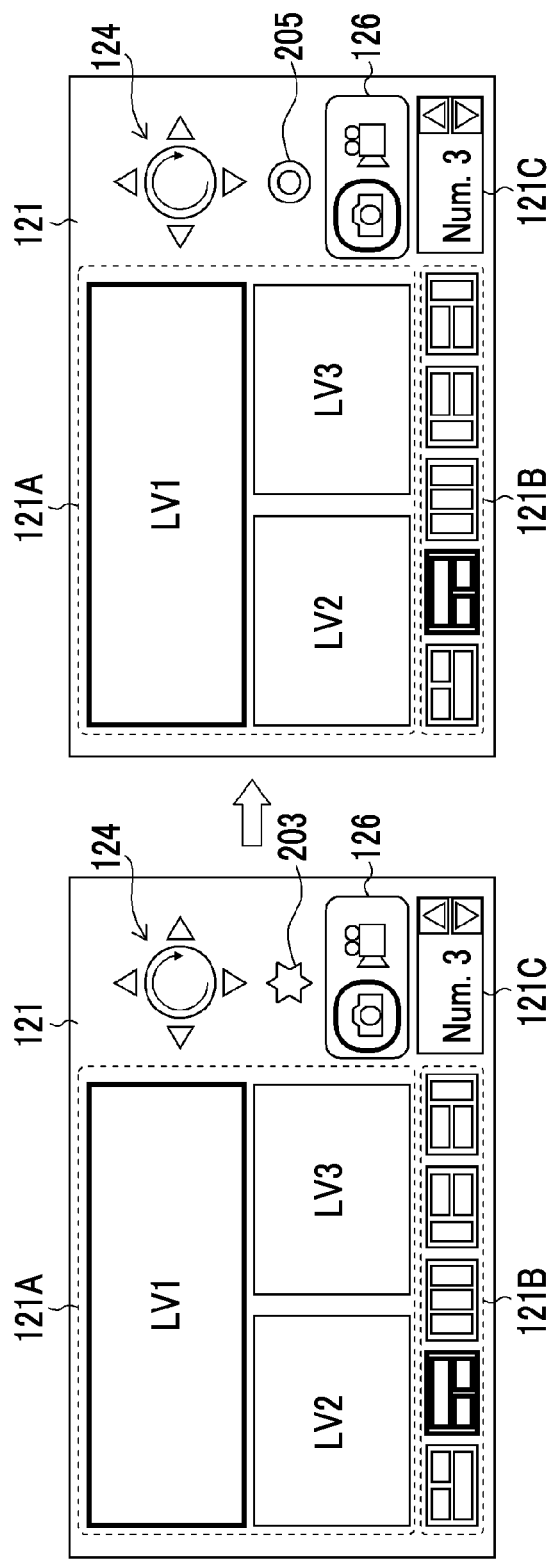
FIG. 16 is a diagram illustrating the display of the instruction receiving unit.

FIGS. 15 and 16 are conceptual diagrams illustrating the display of the instruction receiving unit on the display panel 121 of the display input unit 120 in the smart phone 100. The same components as those described in FIG. 6 are denoted by the same reference numerals and the description thereof will not be repeated.

As illustrated in FIG. 15, the overall control unit 101 displays a first command image 203 and a second command image 205 on the display panel 121. In a case in which a position corresponding to the first command image 203 is touched, the imaging preparation command is transmitted to each of the plurality of imaging devices 10 through the control communication unit 110. In a case in which a position corresponding to the second command image 205 is touched, the captured image acquisition command is transmitted to each of the plurality of imaging devices 10 through the control communication unit 110. That is, the first command image 203 corresponds to the imaging preparation instruction unit and the second command image 205 corresponds to the image acquisition instruction unit. In FIG. 15, the imaging preparation instruction unit (first command image 203) and the image acquisition instruction unit (second command image 205) are displayed on the display panel 121 at the same time. However, the imaging preparation instruction unit or the image acquisition instruction unit may be displayed on the display panel 121.

As described above, in this example, since the first command image 203 and the second command image 205 are displayed at the same time, it is possible to effectively prevent the imaging preparation command and the captured image acquisition command from being erroneously transmitted.

As illustrated in FIG. 16, the first command image 203 and the second command image 205 may be displayed so as to be switched. That is, before the imaging preparation command is transmitted to each of the plurality of imaging devices 10, the overall control unit 101 displays the first command image 203 on the display panel 121. The overall control unit 101 displays the second command image 205 on the display panel 121 after the first command image 203 is touched and the imaging preparation command is transmitted to each of the plurality of imaging devices 10.

As described above, in this example, after the first command image 203 is displayed, the second command image 205 is displayed. Therefore, it is possible to effectively prevent the imaging preparation command and the captured image acquisition command from being erroneously transmitted.

(Instruction Receiving Unit as Hardware Key)

The smart phone 100 has a hardware key as the operation unit (instruction receiving unit) 140 and at least one of the imaging preparation instruction unit or the image acquisition instruction unit may be a hardware key.

Figure 17A:
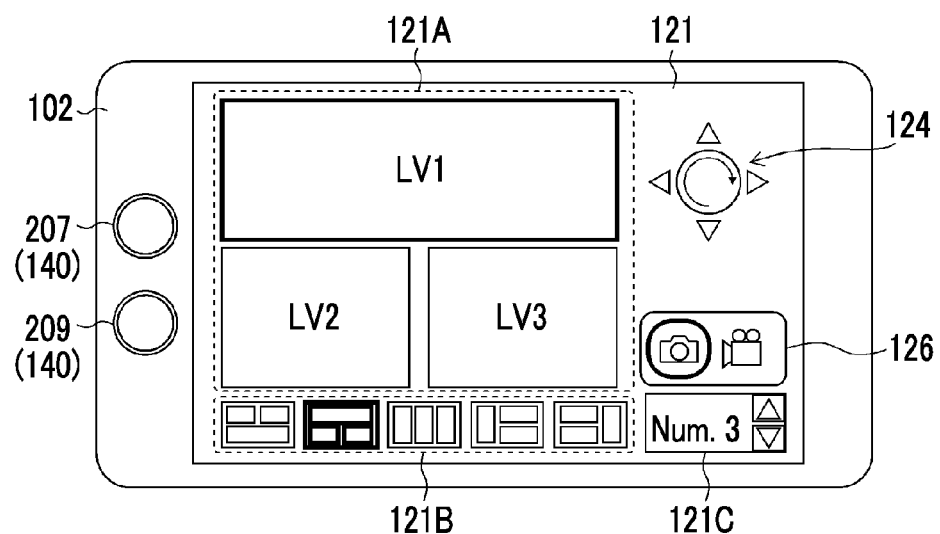
FIG. 17A is a diagram illustrating hardware keys.
Figure 17B:
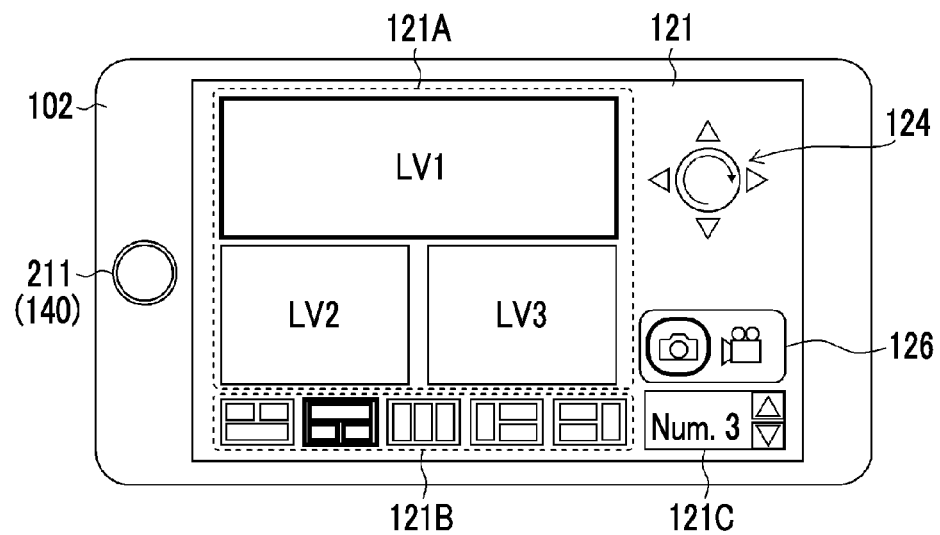
FIG. 17B is a diagram illustrating a hardware key.

FIGS. 17A and 17B are conceptual diagrams illustrating the smart phone 100 having hardware keys provided in the housing 102.

In the case illustrated in FIG. 17A, the hardware keys are a first command key 207 and a second command key 209. In a case in which the first command key 207 receives an instruction, the overall control unit 101 of the smart phone 100 transmits the imaging preparation command to each of the plurality of imaging devices 10 through the control communication unit 110. In a case in which the second command key 209 receives an instruction, the overall control unit 101 of the smart phone 100 transmits the captured image acquisition command to each of the plurality of imaging devices 10 through the control communication unit 110.

In a case in which the second command key 209 receives an instruction before the imaging preparation command is transmitted to each of the plurality of imaging devices 10, the imaging preparation command is transmitted to each of the plurality of imaging devices 10 through the control communication unit 110 before the captured image acquisition command is transmitted. Then, after preparation completion information is received from the plurality of imaging devices 10, the overall control unit 101 of the smart phone 100 transmits the captured image acquisition command to each of the plurality of imaging devices 10 through the control communication unit 110.

In a case in which the second command key 209 receives an instruction before the imaging preparation command is transmitted to each of the plurality of imaging devices 10, the captured image acquisition command is transmitted immediately after preparation completion information is received. Therefore, after the preparation completion information is received, an instruction may not be received by the second command key 209. Immediately after preparation for imaging is completed, images are acquired.

In the case illustrated in FIG. 17B, the hardware keys include a third command key 211. First, when the third command key 211 receives an instruction before the imaging preparation command is transmitted to each of the plurality of imaging devices 10, the overall control unit 101 transmits the imaging preparation command to each of the plurality of imaging devices 10 through the control communication unit 110. Then, when the third command key 211 receives an instruction after the imaging preparation command is transmitted to each of the plurality of imaging devices 10, the overall control unit 101 transmits the captured image acquisition command to each of the plurality of imaging devices 10 through the control communication unit 110.

As described above, in this example, the third command key 211 which is a hardware key is used to transmit the imaging preparation command and the captured image acquisition command. Therefore, the operability of the imaging control device is improved and it is possible to effectively prevent the imaging preparation command and the captured image acquisition command from being erroneously transmitted.

The smart phone 100 which is an example of the imaging control device has been described above. However, the invention is not limited thereto. For example, a tablet terminal with a touch panel and a PDA (portable information terminal) may be used instead of the smart phone 100. In addition, the invention is not limited to the above-described embodiments and various modifications and changes of the invention can be made without departing from the scope and spirit of the invention.

EXPLANATION OF REFERENCES

10: imaging device
20: camera-side imaging unit
22: imaging lens
23: diaphragm
24: imaging element
26: lens driving unit
28: CMOS driver
40: camera-side control unit
41: signal processing unit
42: imaging element control unit 43: lens control unit
50: camera-side wireless communication unit
60: camera-side operating unit
61: camera-side display unit
62: memory
100: smart phone
101: overall control unit
102: housing
110: control communication unit
120: display input unit
121: display panel
121A: display region
121B: display region
121C: display region
122: operation panel
124: cross key
125: imaging start button
130: calling unit
131: speaker
132: microphone
140: operating unit
141: camera unit
150: storage unit
151: internal storage unit
152: external storage unit
160: external input/output unit
170: GPS receiving unit
180: motion sensor unit
190: power supply unit

What is claimed is:

1. An imaging control device comprising:
an instruction receiving unit that receives an instruction from a user;
a control communication unit that communicates with a plurality of imaging devices; and
an overall control unit that is connected to the instruction receiving unit and the control communication unit,
wherein the overall control unit transmits an imaging preparation command to prepare imaging to each of the plurality of imaging devices through the control communication unit in response to the instruction received through the instruction receiving unit,
the overall control unit receives preparation completion information indicating the completion of the preparation for imaging from each of the plurality of imaging devices through the control communication unit, and
after receiving the preparation completion information from the plurality of imaging devices, the overall control unit transmits a captured image acquisition command to acquire a captured image to each of the plurality of imaging devices through the control communication unit,
wherein the instruction receiving unit includes an imaging preparation instruction unit and an image acquisition instruction unit,
the overall control unit transmits the imaging preparation command to each of the plurality of imaging devices through the control communication unit in a case in which the imaging preparation instruction unit receives the instruction, and
the overall control unit transmits the captured image acquisition command to each of the plurality of imaging devices through the control communication unit in a case in which the image acquisition instruction unit receives the instruction,
wherein, in a case in which the image acquisition instruction unit receives the instruction before the preparation completion information is received from all of the plurality of imaging devices, the overall control unit transmits the captured image acquisition command to each of the plurality of imaging devices through the control communication unit based on the instruction after the preparation completion information is received from the plurality of imaging devices.

2. The imaging control device according to claim 1, wherein the preparation for imaging includes at least focus adjustment or focus lock.

3. The imaging control device according to claim 1, wherein, in a case in which the instruction receiving unit receives the instruction, the overall control unit transmits the captured image acquisition command to each of the plurality of imaging devices through the control communication unit.

4. The imaging control device according to claim 1, wherein the instruction receiving unit has a touch panel including a display unit and a position input unit, and
at least one of the imaging preparation instruction unit or the image acquisition instruction unit is formed by the touch panel.

5. The imaging control device according to claim 4, wherein the overall control unit displays a first command image indicating the imaging preparation instruction unit and a second command image indicating the image acquisition instruction unit on the display unit,
in a case in which a position corresponding to the first command image in the position input unit is touched, the overall control unit transmits the imaging preparation command to each of the plurality of imaging devices through the control communication unit, and
in a case in which a position corresponding to the second command image in the position input unit is touched, the overall control unit transmits the captured image acquisition command to each of the plurality of imaging devices through the control communication unit.

6. The imaging control device according to claim 5, wherein the overall control unit displays the first command image and the second command image on the display unit at the same time.

7. The imaging control device according to claim 5, wherein the overall control unit displays the first command image on the display unit before transmitting the imaging preparation command to each of the plurality of imaging devices, and
the overall control unit displays the second command image on the display unit after transmitting the imaging preparation command to each of the plurality of imaging devices.

8. The imaging control device according to claim 1, wherein the instruction receiving unit includes hardware keys, and
at least one of the imaging preparation instruction unit or the image acquisition instruction unit is a hardware key.

9. The imaging control device according to claim 8, wherein the hardware keys include a first command key and a second command key,
in a case in which the first command key receives the instruction, the overall control unit transmits the imaging preparation command to each of the plurality of imaging devices through the control communication unit, and
in a case in which the second command key receives the instruction, the overall control unit transmits the captured image acquisition command to each of the plurality of imaging devices through the control communication unit.

10. The imaging control device according to claim 9, wherein, in a case in which the second command key receives the instruction before the imaging preparation command is transmitted to each of the plurality of imaging devices, the overall control unit transmits the imaging preparation command to each of the plurality of imaging devices through the control communication unit before transmitting the captured image acquisition command and transmits the captured image acquisition command to each of the plurality of imaging devices through the control communication unit after the preparation completion information is received from the plurality of imaging devices.

11. The imaging control device according to claim 8, wherein the hardware keys include a third command key, in a case in which the third command key receives the instruction before the imaging preparation command is transmitted to each of the plurality of imaging devices, the overall control unit transmits the imaging preparation command to each of the plurality of imaging devices through the control communication unit, and in a case in which the third command key receives the instruction after the imaging preparation command is transmitted to each of the plurality of imaging devices, the overall control unit transmits the captured image acquisition command to each of the plurality of imaging devices through the control communication unit.

12. The imaging control device according to claim 8, further comprising:
a display unit that is connected to the overall control unit.

13. The imaging control device according to claim 12, further comprising:
a position input unit that is provided in the display unit, wherein the display unit and the position input unit form a touch panel.

14. The imaging control device according to claim 5, wherein the overall control unit displays a third command image indicating an instruction to perform the preparation for imaging again on the display unit after the preparation completion information is received, and
in a case in which a position corresponding to the third command image in the position input unit is touched, the overall control unit transmits a re-preparation command to perform the preparation for imaging again to each of the plurality of imaging devices through the control communication unit.

15. The imaging control device according to claim 14, wherein the overall control unit displays third command images related to each of the plurality of imaging devices on the display unit, and in a case in which a position corresponding to the third command image in the position input unit is touched, the overall control unit transmits the re-preparation command only to an imaging device associated with the third command image corresponding to the touched position among the plurality of imaging devices through the control communication unit.

16. The imaging control device according to claim 14, wherein the overall control unit receives live view image data from at least one of the plurality of imaging devices through the control communication unit,
the overall control unit displays a live view image created from the live view image data on the display unit, and
the third command image is the live view image.

17. The imaging control device according to claim 1, wherein the overall control unit transmits a burst capture command to perform a burst capture to each of the plurality of imaging devices through the control communication unit after the preparation for imaging is completed, and
the captured image acquisition command includes imaging time information indicating the imaging time of a captured image which is used as a synchronous image among the captured images acquired by the burst capture operation of each of the plurality of imaging devices.

18. The imaging control device according to claim 1, wherein the overall control unit receives error notification information indicating an error from each of the plurality of imaging devices through the control communication unit, and
in a case in which the error notification information is received, the overall control unit notifies the user of the error.

19. The imaging control device according to claim 18, wherein the error is an error in the preparation for imaging in each of the plurality of imaging devices.

20. The imaging control device according to claim 18, further comprising:
a display unit that is connected to the overall control unit, wherein the overall control unit receives live view image data from each of the plurality of imaging devices through the control communication unit,
the overall control unit displays a live view image created from the live view image data on the display unit, and
the overall control unit displays an error image indicating the error on the display unit so as to be superimposed on the live view image captured by an imaging device in which the error has occurred among the plurality of imaging devices.

* * * * *